US010650340B2

(12) United States Patent
Kovach et al.

(10) Patent No.: US 10,650,340 B2
(45) Date of Patent: May 12, 2020

(54) TRACKING AND/OR ANALYZING FACILITY-RELATED ACTIVITIES

(71) Applicant: Accenture Global Solutions Limited, Dublin (IE)

(72) Inventors: Robert A. Kovach, Houston, TX (US); Brian H. Richards, The Woodlands, TX (US); Brian J. Green, Springfield, VA (US); Ramoj Kumar Paruchuri, Sugarland, TX (US); Jordan Thomas, Houston, TX (US); Sarah Crabb, Houston, TX (US); Zhijie Wang, Fremont, CA (US); Hao Zhou, Edgewater, NJ (US); Manas R. Satapathy, Sugar Land, TX (US); Prashant Kumar Mehrotra, Houston, TX (US); Anant Sharma, Houston, TX (US); Peter Daniel Corkum, Houston, TX (US)

(73) Assignee: Accenture Global Solutions Limited, Dublin (IE)

( * ) Notice: Subject to any disclaimer, the term of this patent is extended or adjusted under 35 U.S.C. 154(b) by 298 days.

(21) Appl. No.: 15/714,570

(22) Filed: Sep. 25, 2017

(65) Prior Publication Data
US 2019/0080274 A1  Mar. 14, 2019

Related U.S. Application Data

(60) Provisional application No. 62/556,068, filed on Sep. 8, 2017.

(51) Int. Cl.
*G06Q 10/06* (2012.01)
*G06K 9/00* (2006.01)
*G06K 9/20* (2006.01)

(52) U.S. Cl.
CPC ... *G06Q 10/06398* (2013.01); *G06K 9/00201* (2013.01); *G06K 9/00288* (2013.01); (Continued)

(58) Field of Classification Search
CPC ......... G06Q 10/00; G06Q 40/06; G06Q 40/00 (Continued)

(56) References Cited

U.S. PATENT DOCUMENTS

| 6,529,620 | B2 * | 3/2003 | Thompson | ............. | G06Q 10/06 |
| | | | | | 382/141 |
| 7,068,301 | B2 * | 6/2006 | Thompson | ............. | G06Q 10/06 |
| | | | | | 348/141 |

(Continued)

OTHER PUBLICATIONS

Architecture Development Team (National ITS Architecture Physical Architecture), Jan. 2012, U.S. Department of Transportation, pp. 1-462 (Year: 2012).*
Tony (Facility Programming for a New Fleet Maintenance Facility), Jan. 2012, Government Fleet, pp. 1-6 (Year: 2012).*
Extended European Search report corresponding to EP 18 19 1119 dated Oct. 9, 2018, 9 pages.

*Primary Examiner* — Romain Jeanty
(74) *Attorney, Agent, or Firm* — Harrity & Harrity, LLP

(57) ABSTRACT

A device may receive video of a facility from an image capture system. The video may show an individual within the facility, an object within the facility, or an activity being performed within the facility. The device may process the video using a technique to identify the individual within the facility, the object within the facility, or the activity being performed within the facility. The device may track the individual, the object, or the activity through the facility to facilitate an analysis of the individual, the object, or the activity. The device may perform the analysis of the individual, the object, or the activity using information related to tracking the individual, the object, or the activity. The device may perform an action related to the individual, the object, (Continued)

or the activity based on a result of the analysis. The action may positively impact operations of the facility.

23 Claims, 13 Drawing Sheets

(52) U.S. Cl.
CPC ..... G06K 9/00718 (2013.01); G06Q 10/0639 (2013.01); *G06K 9/00369* (2013.01); *G06K 2009/2045* (2013.01)

(58) Field of Classification Search
USPC ....................................................... 705/7.42
See application file for complete search history.

(56) References Cited

U.S. PATENT DOCUMENTS

| | | | | |
|---|---|---|---|---|
| 7,756,679 | B2* | 7/2010 | Nagafuchi | G06Q 10/06 702/184 |
| 9,041,509 | B2* | 5/2015 | Kobayashi | G05B 15/02 340/3.1 |
| 9,407,880 | B2* | 8/2016 | Renkis | H04N 7/181 |
| 2009/0161918 | A1 | 6/2009 | Heller et al. | |
| 2011/0273592 | A1 | 11/2011 | Yamaoka et al. | |
| 2013/0070056 | A1 | 3/2013 | Tripathi et al. | |
| 2014/0244344 | A1 | 8/2014 | Bilet et al. | |
| 2016/0239769 | A1 | 8/2016 | Modi et al. | |

* cited by examiner

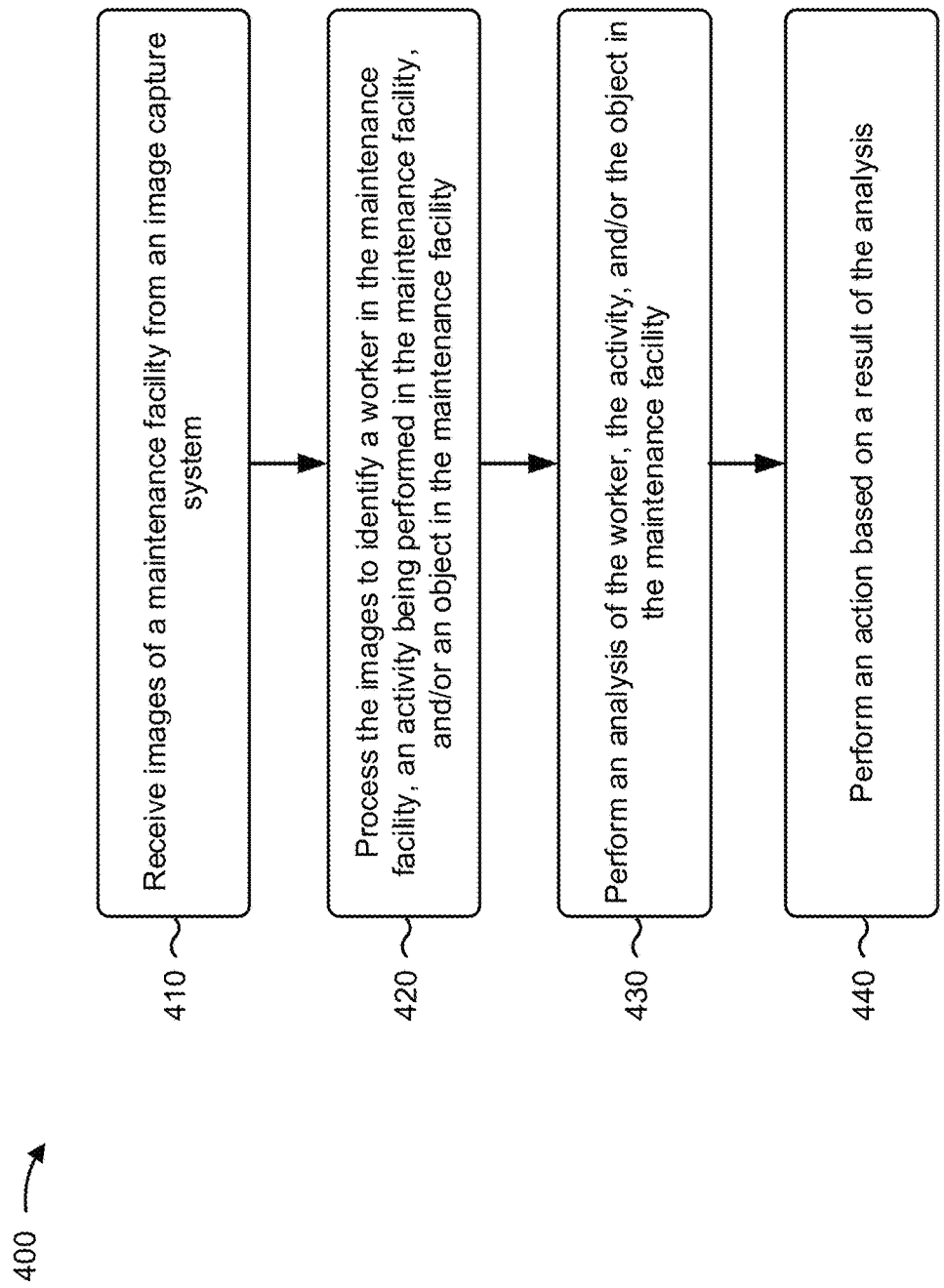

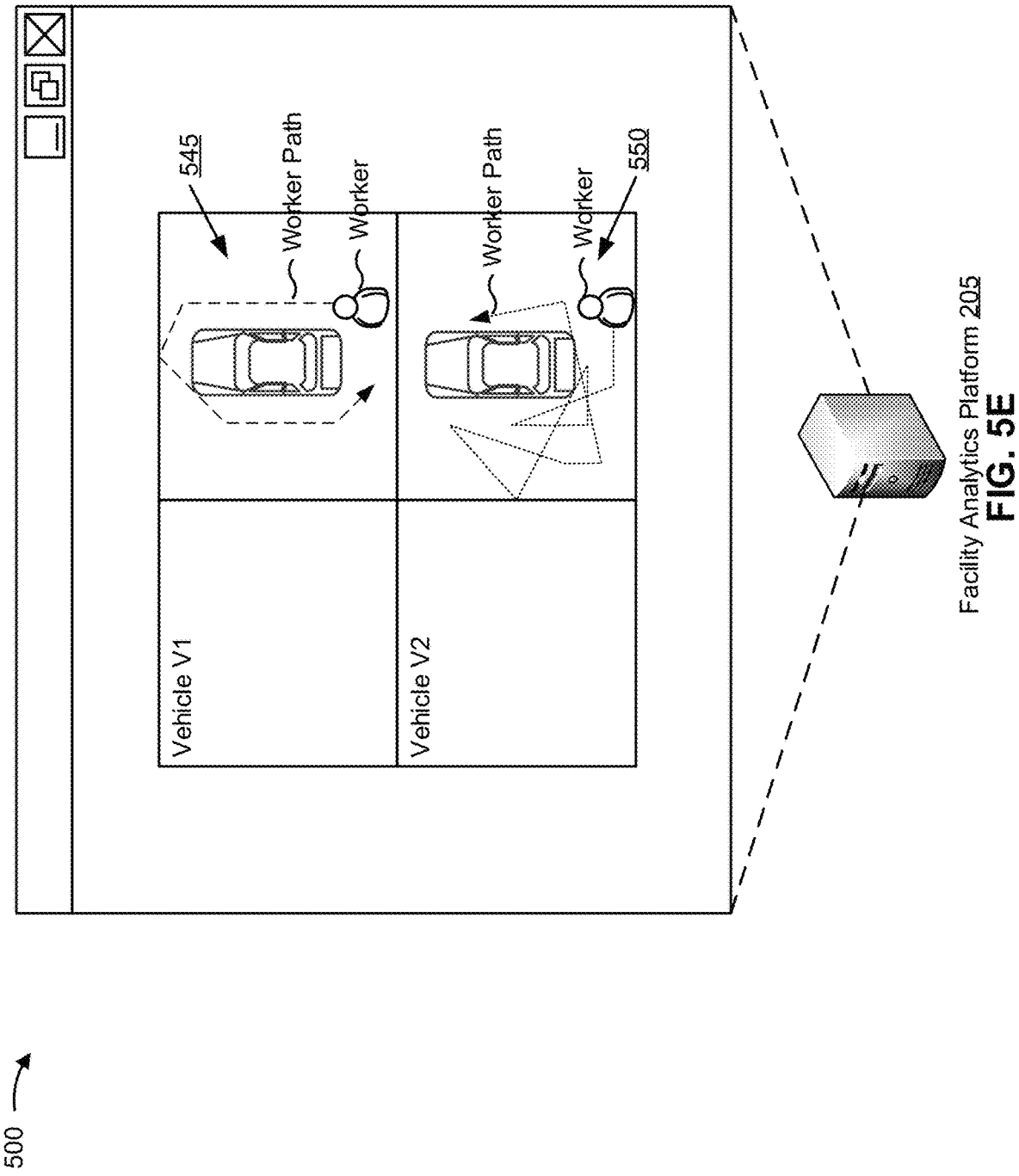

TRACKING AND/OR ANALYZING FACILITY-RELATED ACTIVITIES

RELATED APPLICATION(S)

This application claims priority under 35 U.S.C. § 119 to U.S. Provisional Patent Application No. 62/556,068, filed on Sep. 8, 2017, the content of which is incorporated by reference herein in its entirety.

BACKGROUND

Video content analysis, or video content analytics, is the capability of automatically analyzing video to detect and determine temporal and spatial events. Video content analysis may be utilized to recognize shapes, detect objects, recognize individuals, or the like.

SUMMARY

According to some possible implementations, a device may include one or more processors to receive video of a facility from an image capture system. The video may show at least one of an individual within the facility, an object within the facility, or an activity being performed within the facility. The one or more processors may process the video using a technique to identify the individual within the facility, the object within the facility, or the activity being performed within the facility. The one or more processors may track the individual, the object, or the activity through the facility to facilitate an analysis of the individual, the object, or the activity. The one or more processors may perform the analysis of the individual, the object, or the activity using information related to tracking the individual, the object, or the activity. The one or more processors may perform an action related to the individual, the object, or the activity based on a result of the analysis. The action may positively impact operations of the facility.

According to some possible implementations, a method may include receiving, by a device, an image of a maintenance facility from an image capture system. The image may depict an individual within the maintenance facility, equipment within the maintenance facility on which the individual is to perform a maintenance activity, or an activity being performed within the maintenance facility. The method may include processing, by the device, the image using an image processing technique to identify the individual, the equipment, or the activity. The method may include tracking, by the device, the individual, the equipment, or the activity through multiple images of the maintenance facility to facilitate an analysis of the individual, the equipment, or the activity. The method may include performing, by the device, the analysis of the individual, the equipment, or the activity based on a result of tracking the individual, the equipment, or the activity. The analysis may identify underperforming operations of the maintenance facility. The method may include performing, by the device, an action related to the individual, the equipment, or the activity based on a result of the analysis. The action may positively impact operations of the maintenance facility.

According to some possible implementations, a non-transitory computer-readable medium may store one or more instructions that, when executed by one or more processors, cause the one or more processors to receive one or more images of a maintenance facility. The one or more images may show one or more individuals within the maintenance facility, one or more equipment within the maintenance facility, or one or more activities being performed within the maintenance facility. The one or instructions, when executed by the one or more processors, may cause the one or more processors to process the one or more images using one or more techniques to identify the one or more individuals in the maintenance facility, the one or more equipment in the maintenance facility, or the one or more activities being performed in the maintenance facility. The one or instructions, when executed by the one or more processors, may cause the one or more processors to track the one or more individuals, the one or more equipment, or the one or more activities through the maintenance facility. The one or instructions, when executed by the one or more processors, may cause the one or more processors to map information identifying the one or more individuals, the one or more equipment, or the one or more activities to a map of the maintenance facility based on a result of tracking the one or more individuals, the one or more equipment, or the one or more activities.

The one or instructions, when executed by the one or more processors, may cause the one or more processors to perform one or more analyses of the one or more individuals, the one or more equipment, or the one or more activities after mapping the information to the map of the maintenance facility. The one or more analyses may identify operations of the maintenance facility. The one or instructions, when executed by the one or more processors, may cause the one or more processors to perform one or more actions related to the one or more individuals, the one or more equipment, or the one or more activities based on one or more results of the one or more analyses. The one or more actions may positively impact the operations of the maintenance facility.

BRIEF DESCRIPTION OF THE DRAWINGS

FIG. 4 is a flow chart of an example process for tracking and/or analyzing facility-related activities; and FIGS. 5A-5E are diagrams of an example implementation relating to the example process shown in FIG. 4.

DETAILED DESCRIPTION

Figure 1A:
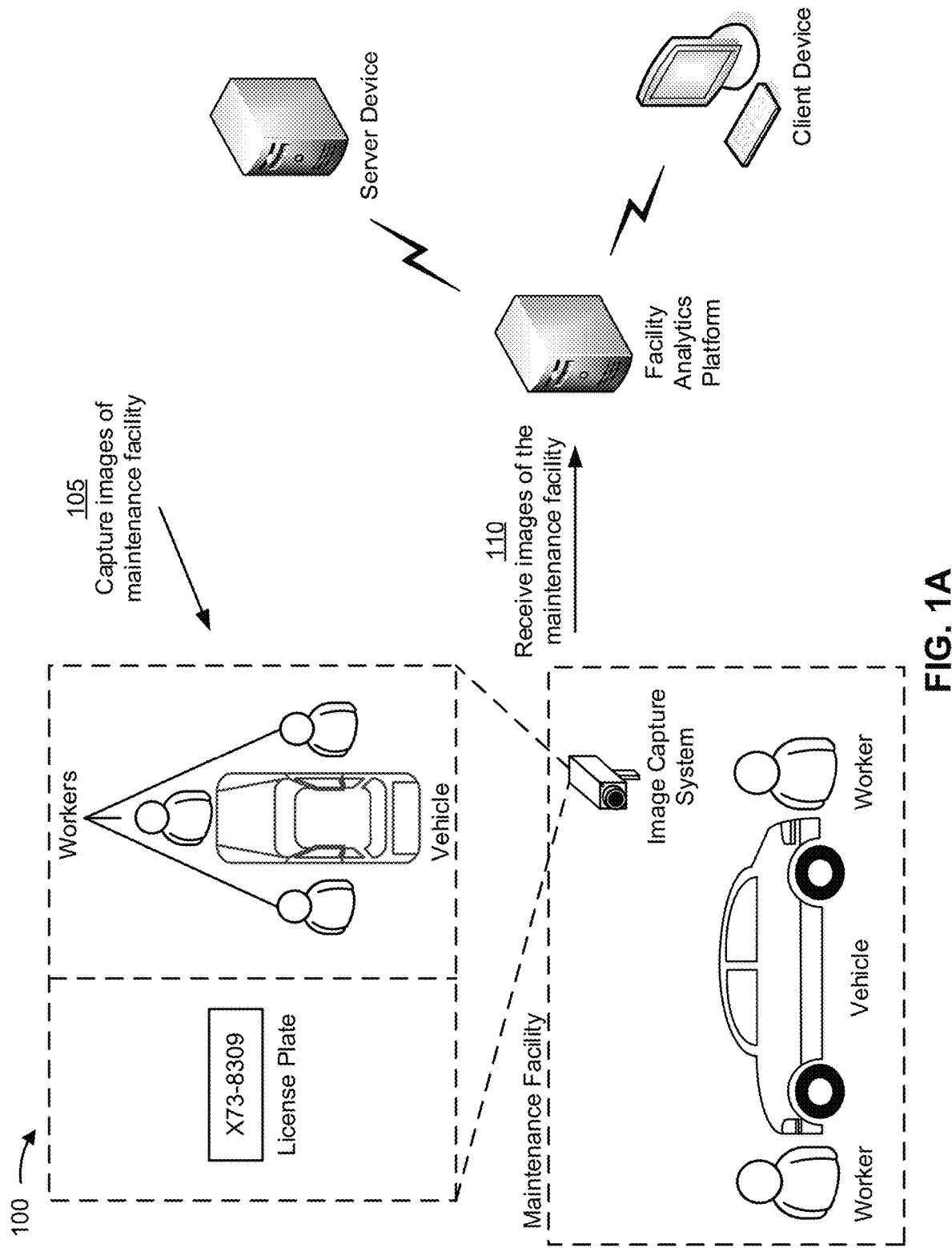
FIGS. 1A-1E are diagrams of an overview of an example implementation described herein.

The following detailed description of example implementations refers to the accompanying drawings. The same reference numbers in different drawings may identify the same or similar elements.

Ensuring that a maintenance facility operates effectively may depend on efficient deployment and use of resources of the maintenance facility (e.g., maintenance bays, workers, etc.). For example, inefficient operations of the maintenance facility caused by decreased worker productivity, unused maintenance bays, having too many workers assigned to a maintenance activity, and/or the like can cause delays with respect to maintenance activities, result in reduced quality of maintenance activities, and/or the like. These problems can be compounded when the maintenance facility serves a large fleet of vehicles (e.g., a fleet of trucks, a fleet of aircraft, etc.).

Some techniques for monitoring operations of a maintenance facility may include use of, for example, radio-frequency identification (RFID) to provide insight into operations of a maintenance facility and/or deployment of resources of the maintenance facility. These techniques, however, may be limited in the amount of detail provided with respect to the operations and/or resources of the maintenance facility. In addition, these techniques may be better suited for monitoring movement of non-human resources within the maintenance facility and may not be well suited for monitoring a combination of activities, human resources, and non-human resources related to the maintenance facility.

Some implementations, described herein, provide a facility analytics platform that is capable of capturing images and/or video of operations of a maintenance facility and analyzing the operations. In this way, the facility analytics platform may analyze activities, human resources, and/or non-human resources related to a maintenance facility to analyze an effectiveness of operations of the maintenance facility and/or deployment of resources of the maintenance facility. This improves an accuracy of an analysis of operations and/or resources related to a maintenance facility, thereby conserving processing resources that would otherwise be consumed via a less accurate analysis. In addition, this improves utilization of resources of a maintenance facility, via improved operations of the maintenance facility, thereby reducing waste and/or inefficient consumption of resources of the maintenance facility. Further, this improves throughput of the maintenance facility, thereby improving operations of the maintenance facility.

FIGS. 1A-1E are diagrams of an overview of an example implementation 100 described herein. As shown in FIGS. 1A-1E, example implementation 100 may include a maintenance facility (e.g., where maintenance activities are performed on vehicles), an image capture system installed at the maintenance facility (e.g., that includes tens, hundreds, thousands, etc. of cameras), a facility analytics platform, a server device, and a client device. Although FIGS. 1A-1E show a single server device and a single client device, in practice there may be tens, hundreds, thousands, millions, etc. of server devices and/or client devices.

As shown in FIG. 1A, and as shown by reference number 105, the image capture system may capture images of the maintenance facility. For example, the image capture system may capture images of vehicles and/or equipment within the maintenance facility, entering the maintenance facility, leaving the maintenance facility, moving within the maintenance facility, and/or the like. Additionally, or alternatively, the image capture system may capture images of information that identifies the vehicles and/or equipment (e.g. a license plate of a vehicle, a serial number of equipment, a part number of equipment, a type of vehicle, a type of equipment, etc.), images of particular areas of the maintenance facility (e.g., maintenance bays, a spare parts storage area, etc.), images of workers in the maintenance facility, images of activities of the workers, and/or the like. In some implementations, the image capture system may capture video.

As further shown in FIG. 1A, and as shown by reference number 110, the facility analytics platform may receive images of the maintenance facility (e.g., from the image capture system). In practice, the facility analytics platform may receive thousands, millions, billions, etc. of data elements when receiving images. In this way, the facility analytics platform may receive a data set that cannot be processed manually or objectively by a human actor.

Figure 1B:
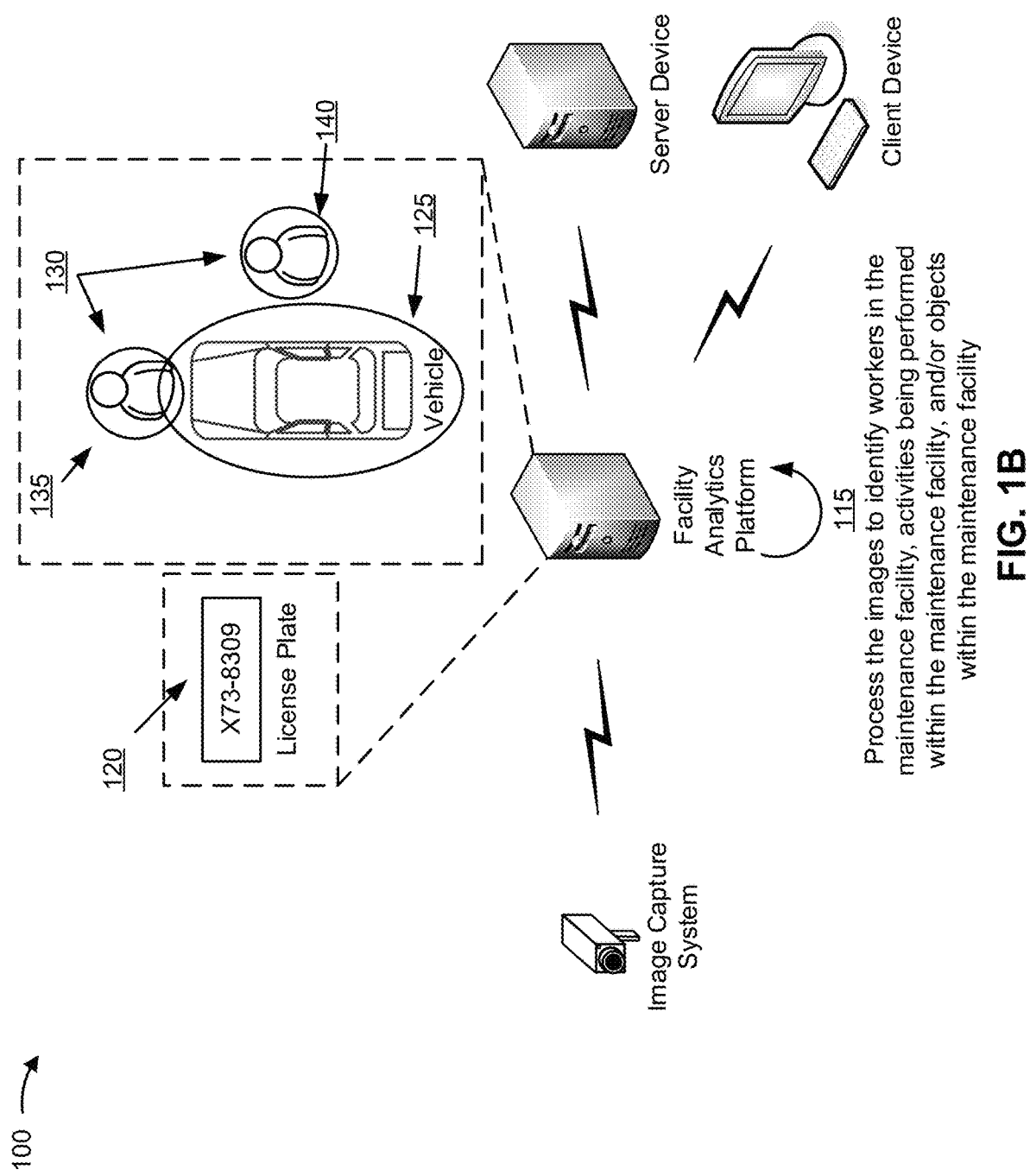

As shown in FIG. 1B, and by reference number 115, the facility analytics platform may process the images to identify workers in the maintenance facility, activities being performed within the maintenance facility, and/or objects within the maintenance facility. The facility analytics platform may process the images using a technique to identify text in the images (e.g., of a license plate or a serial number), objects (e.g., equipment, tools, etc.) or people (e.g., workers, supervisors, etc.) shown (e.g., depicted) in the images, activities shown in the images, and/or the like. For example, the facility analytics platform may use an image processing technique, such as a fuzzy logic image processing technique, a computer vision technique, a shape detection technique, a technique that includes use of a color histogram, a motion detection technique, and/or the like to process the images (e.g., where the facility analytics platform has been trained to identify objects, people, activities, etc. in images and/or video).

As an example, and as shown by reference number 120, the facility analytics platform may process an image of a license plate of a vehicle entering the maintenance facility to identify a license plate number for the vehicle, such as to permit the facility analytics platform to identify vehicles that are entering the maintenance facility. As shown by reference number 125, the facility analytics platform may identify whether a vehicle and/or a type of vehicle is present in a maintenance bay of the maintenance facility. As shown by reference number 130, the facility analytics platform may identify workers in the maintenance facility and/or within a particular maintenance bay of the maintenance facility.

As shown by reference number 135, the facility analytics platform may identify workers that are actively working on a vehicle. In this case, the facility analytics platform may determine that a worker is actively working on a vehicle by identifying an activity in which the worker is engaged, a proximity of the worker to an identified vehicle, and/or the like. Additionally, or alternatively, and as shown by reference number 140, the facility analytics platform may identify workers that are not actively working. In this case, the facility analytics platform may identify a worker that is not actively working based on a location of a worker relative to a vehicle (e.g., a worker that is not within a threshold distance of a vehicle being serviced), by identifying an activity in which the worker is engaged (e.g., a non-maintenance activity), and/or the like.

In some implementations, when identifying objects, workers, and/or activities in the maintenance facility, the facility analytics platform may determine a score for identified objects, workers, and/or activities that indicates a confidence level that the objects, workers, and/or activities are correctly identified. For example, a score may be based on a degree to which objects, workers, and/or activities identified in images of the maintenance facility match training images of objects, workers, and/or activities.

In some implementations, the facility analytics platform may receive data from the server device related to operations of the maintenance facility to improve identification of objects, workers, and/or the like. For example, if distortion of an image occurs due to warping, or a physical obstruction in the maintenance facility causes the facility analytics platform to fail to identify a license plate number of a vehicle entering the maintenance facility with a threshold confidence level, the facility analytics platform may use data related to scheduled maintenances to determine if the identified license plate number matches a license plate number of a vehicle scheduled for maintenance for that day.

In some implementations, the facility analytics platform may combine a result of processing images from different cameras to improve results of processing images (e.g., where the images overlap with respect to an area of the maintenance facility shown in the images). For example, the facility analytics platform may use a result of processing a first image to confirm a result of processing a second image, may use a result of processing a first image to increase a score for a result of processing a second image, may weight a result of processing a first image higher than a result of processing a second image when a result of processing the first image is associated with a higher score than the result of processing the second image, and/or the like.

Figure 1C:
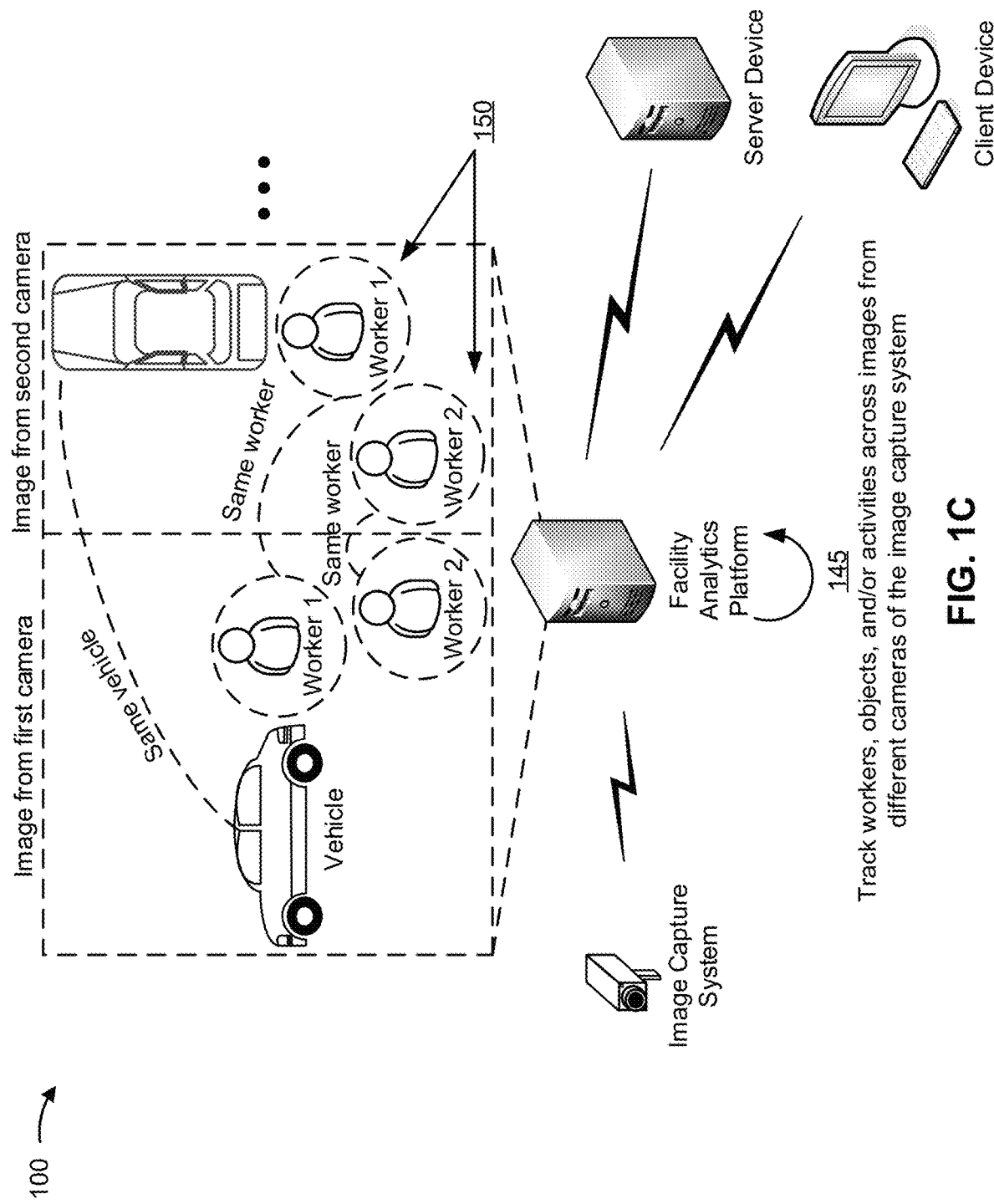

As shown in FIG. 1C, and as shown by reference number 145, the facility analytics platform may track workers, objects, and/or activities across images from different cameras of the image capture system. For example, the facility analytics platform may track workers, objects, and/or activities to monitor movement of the workers and/or equipment through the maintenance facility, such as to facilitate an analysis of the workers, the equipment, and/or activities.

In some implementations, the facility analytics platform may determine whether the same worker has been identified in images captured by different cameras (e.g., with a threshold confidence level). For example, the facility analytics platform may use a facial recognition technique, an identity recognition technique (e.g., where characteristics of an individual, such as height, weight, gait, facial features, etc., are combined to create a unique identity for an individual), and/or the like to identify the same individual in different images. Reference number 150 shows an example of identifying the same workers in two different images from two different cameras. In this case, the facility analytics platform may receive information related to timestamps of the images, locations of the cameras, data related to work schedules and/or the like to improve tracking of workers. For example, the facility analytics platform may correct instances where a worker is identified in two different locations at the same time or where a worker not on duty is incorrectly identified in an image.

Figure 1D:
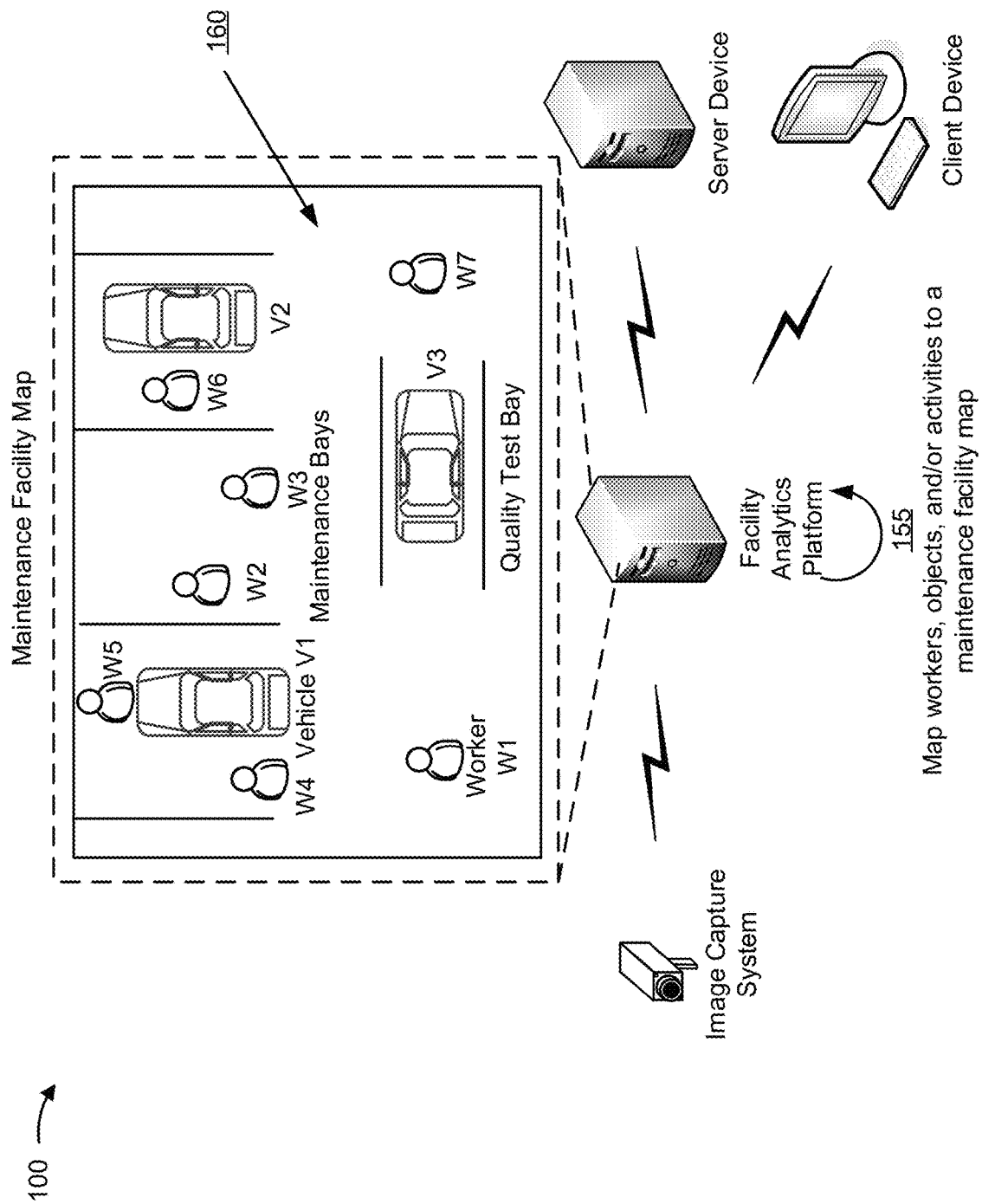

As shown in FIG. 1D, and by reference number 155, the facility analytics platform may map workers, objects, and/or activities to a maintenance facility map. For example, the facility analytics platform may map workers, objects, and/or activities to obtain a maintenance facility-wide view of operations of the maintenance facility and/or deployment of resources of the maintenance facility. In some implementations, the facility analytics platform may normalize coordinate systems of images from different cameras based on a location of the cameras, a direction in which the cameras are pointed, and/or the like (e.g., to determine a location of objects within the maintenance facility).

As further shown in FIG. 1D, and as shown by reference number 160, the facility analytics platform may map information identifying objects (e.g., vehicles) and/or workers in the maintenance facility to a map of the maintenance facility. For example, the facility analytics platform may map vehicles to various types of bays within the maintenance facility (e.g., maintenance bays, a quality test bay, etc.), workers to the various types of bays and/or other areas of the maintenance facility, and/or the like.

Figure 1E:
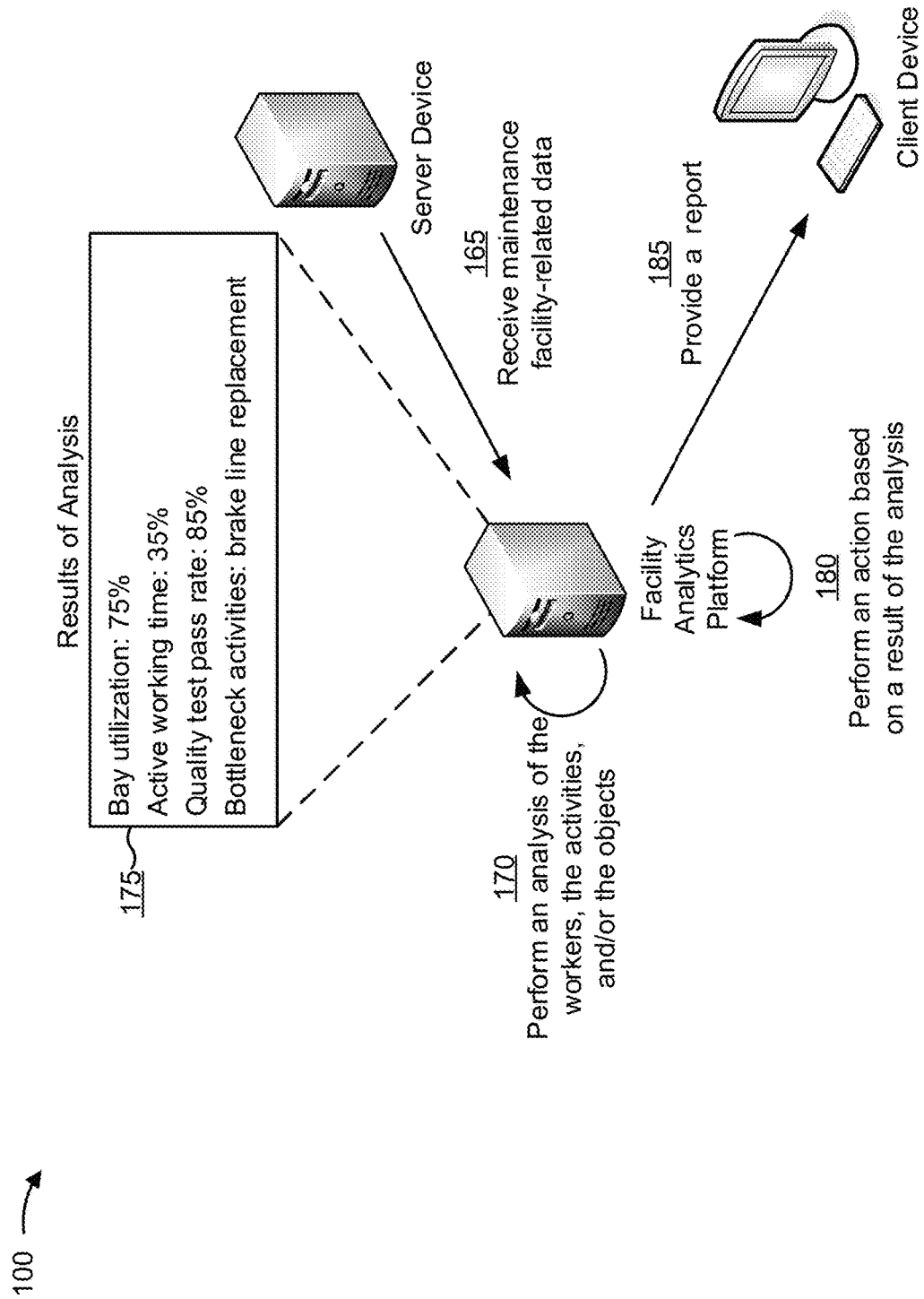

As shown in FIG. 1E, and as shown by reference number 165, the facility analytics platform may receive maintenance facility-related data. In some implementations, the facility analytics platform may receive the data to permit the facility analytics platform to analyze operations of the maintenance facility, to analyze deployment and/or use of resources of the maintenance facility, and/or the like. For example, the facility analytics platform may receive data related to work orders for scheduled maintenance, worker schedules, a schedule of maintenance to be performed on equipment and/or by workers, historical data related to an amount of time to perform maintenance activities, and/or the like. In this case, the facility analytics platform may process the data using a text processing technique, such as a natural language processing technique, a computational linguistics technique, a text analysis technique, and/or the like to identify terms and/or phrases associated with the data.

As further shown in FIG. 1E, and as shown by reference number 170, the facility analytics platform may perform an analysis of the workers, the activities, and/or the equipment. For example, the facility analytics platform may determine an efficiency of use of resources of the maintenance facility (e.g., maintenance bays), a productivity of workers in the maintenance facility (e.g., a percentage of time spent performing maintenance activities), an efficiency of workers (e.g., a difference between an amount time that a worker spends performing an activity and a historical amount of time needed for that same maintenance activity), a quality of work performed by a worker (e.g., whether equipment had to be returned to a maintenance bay), and/or the like. In some implementations, the facility analytics platform may determine a score for a worker, a resource of the maintenance facility, an activity, and/or the like (e.g., based on an efficiency, a productivity, etc.). In this case, the facility analytics platform may determine whether the score satisfies a threshold.

As further shown in FIG. 1E, and as shown by reference number 175, example results of the analysis may include determination of an amount of time a maintenance bay is utilized, an amount of time during a work day that a worker is actively working, a pass rate of maintenance activities performed by a worker, particular maintenance activities that cause delays within the maintenance facility, and/or the like. As shown by reference number 180, the facility analytics platform may perform an action based on a result of the analysis. For example, the facility analytics platform may generate a report identifying a result of an analysis, may send a message to a supervisor of the maintenance facility with respect to a result of the analysis, and/or the like. As shown by reference number 185, the facility analytics platform may provide a report to the client device for display.

In this way, a facility analytics platform may analyze activities, human resources, and/or non-human resources related to a maintenance facility to analyze an effectiveness of operations of the maintenance facility and/or deployment of resources of the maintenance facility. This improves an accuracy of an analysis of operations and/or resources related to a maintenance facility, thereby conserving processing resources that would otherwise be consumed via a less accurate analysis. In addition, this improves utilization of resources of a maintenance facility, via improved operations of the maintenance facility, thereby reducing waste and/or inefficient consumption of resources of the maintenance facility. Further, this improves throughput of the maintenance facility, thereby improving operations of the maintenance facility.

As indicated above, FIGS. 1A-1E are provided merely as an example. Other examples are possible and may differ from what was described with regard to FIGS. 1A-1E. For example, although described with respect to a maintenance facility, the implementations apply equally to other types of facilities, such as a manufacturing facility, a shipping facility, and/or the like. In addition, the implementations apply equally to other contexts, such as an analysis of activities to determine compliance with regulations and/or organization policies, an analysis of activities to identify potentially hazardous and/or prohibited activities (e.g., to identify smoke in a facility, to identify placement of an object that blocks an emergency exit, etc.), an analysis of activities to identify usage of safety equipment, and/or the like.

Figure 2:
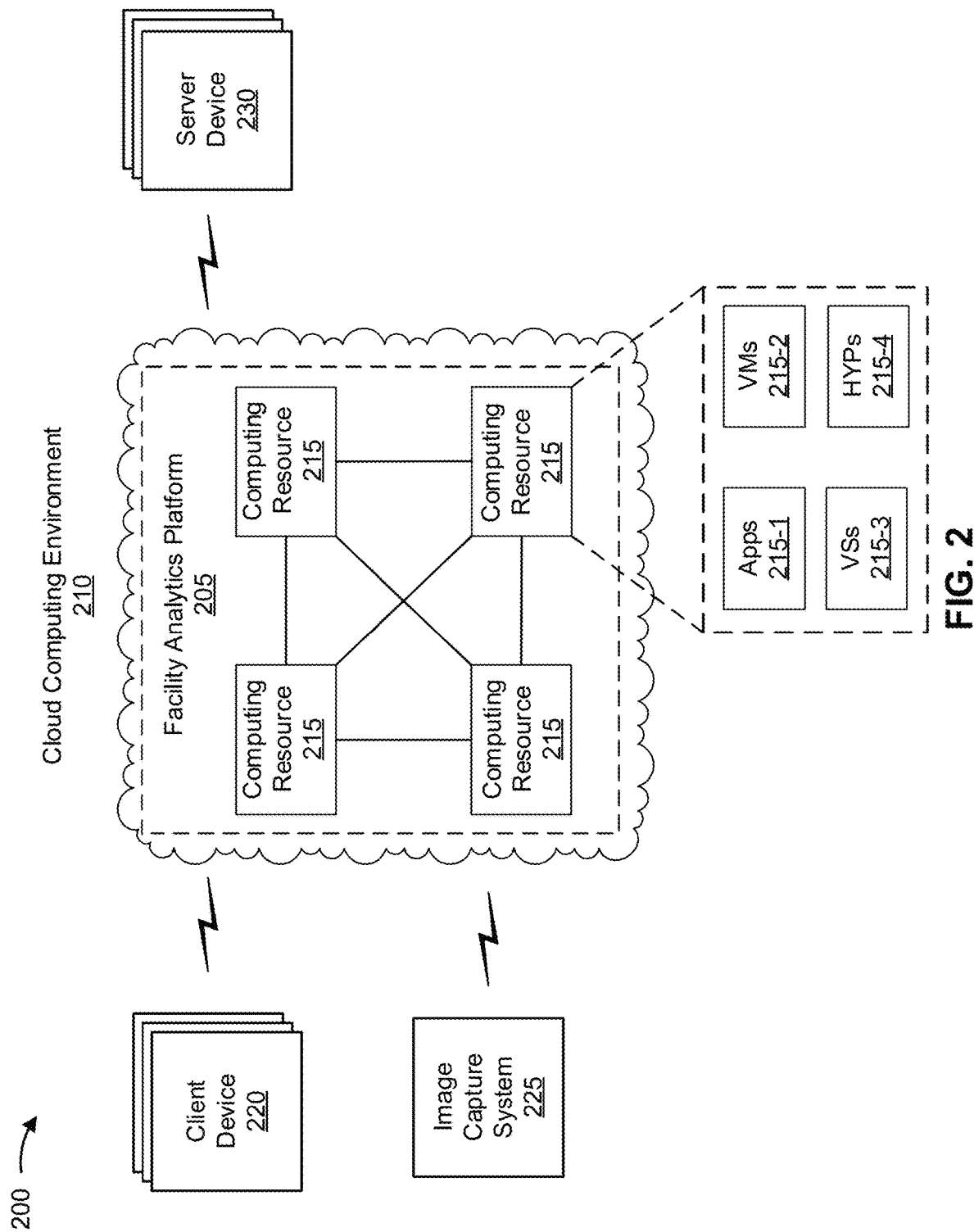
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a facility analytics platform 205 hosted within a cloud computing environment 210, a set of computing resources 215, one or more client devices 220 (referred to collectively as "client devices 220," and individually as "client device 220"), an image capture system 225, and one or more server devices 230 (referred to collectively as "server devices 230," and individually as "server device 230"). Devices of environment 200 may interconnect via wired connections, wireless connections, or a combination of wired and wireless connections.

Facility analytics platform 205 includes one or more devices capable of detecting an object, a person, and/or an activity in an image. For example, facility analytics platform 205 may include a cloud server or a group of cloud servers. In some implementations, facility analytics platform 205 may be designed to be modular such that certain software components can be swapped in or out depending on a particular need. As such, facility analytics platform 205 may be easily and/or quickly reconfigured for different uses.

In some implementations, as shown, facility analytics platform 205 may be hosted in cloud computing environment 210. Notably, while implementations described herein describe facility analytics platform 205 as being hosted in cloud computing environment 210, in some implementations, facility analytics platform 205 may not be cloud-based (i.e., may be implemented outside of a cloud computing environment) or may be partially cloud-based.

Cloud computing environment 210 includes an environment that hosts facility analytics platform 205. Cloud computing environment 210 may provide computation, software, data access, storage, etc. services that do not require end-user knowledge of a physical location and configuration of system(s) and/or device(s) that host facility analytics platform 205. As shown, cloud computing environment 210 may include a group of computing resources 215 (referred to collectively as "computing resources 215" and individually as "computing resource 215").

Computing resource 215 includes one or more personal computers, workstation computers, server devices, or other types of computation and/or communication devices. In some implementations, computing resource 215 may host facility analytics platform 205. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, one or more virtualized storages ("VSs") 215-3, or one or more hypervisors ("HYPs") 215-4.

Application 215-1 includes one or more software applications that may be provided to or accessed by one or more devices of environment 200. Application 215-1 may eliminate a need to install and execute the software applications on devices of environment 200. For example, application 215-1 may include software associated with facility analytics platform 205 and/or any other software capable of being provided via cloud computing environment 210. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., client device 220), and may manage infrastructure of cloud computing environment 210, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 may provide hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Client device 220 includes one or more devices capable of receiving, generating, storing, processing, and/or providing information associated with an individual, an activity, and/or an object (e.g., in a maintenance facility). For example, Client device 220 may include a mobile phone (e.g., a smart phone or a radiotelephone), a laptop computer, a desktop computer, a tablet computer, a gaming device, a wearable communication device (e.g., a smart wristwatch, a pair of smart eyeglasses, etc.), or a similar type of device. In some implementations, Client device 220 may transmit data to facility analytics platform 205, as described elsewhere herein. Additionally, or alternatively, client device 220 may receive data and/or a message from facility analytics platform 205, as described elsewhere herein.

Image capture system 225 includes one or more devices capable of receiving, generating, storing, processing, and/or providing information associated with an image, a set of images, and/or video. For example, image capture system 225 may include one or more cameras (e.g., one or more digital video cameras, still image cameras, infrared cameras, etc. installed at a location or at a premises), one or more server devices (e.g., one or more server devices 230), one or more client devices (e.g., one or more client devices 220), or other similar types of devices. In some implementations, image capture system 225 may capture an image, a set of images, and/or video (e.g., using one or more cameras), as described elsewhere herein. Additionally, or alternatively, image capture system 225 may provide the image, the set of images, and/or the video to facility analytics platform 205, as described elsewhere herein.

Server device 230 includes one or more devices capable of receiving, providing, storing, processing, and/or generating information associated with an image and/or a facility (e.g., a maintenance facility). For example, server device 230 may include a server (e.g., in a data center or a cloud computing environment), a data center (e.g., a multi-server micro data center), a workstation computer, a virtual machine (VM) provided in a cloud computing environment, or a similar type of device. In some implementations, server device 230 may include a communication interface that allows server device 230 to receive information from and/or transmit information to other devices in environment 200. In some implementations, server device 230 may receive information from facility analytics platform 205, as described elsewhere herein. Additionally, or alternatively, server device 230 may provide the information to facility analytics platform 205, as described elsewhere herein.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
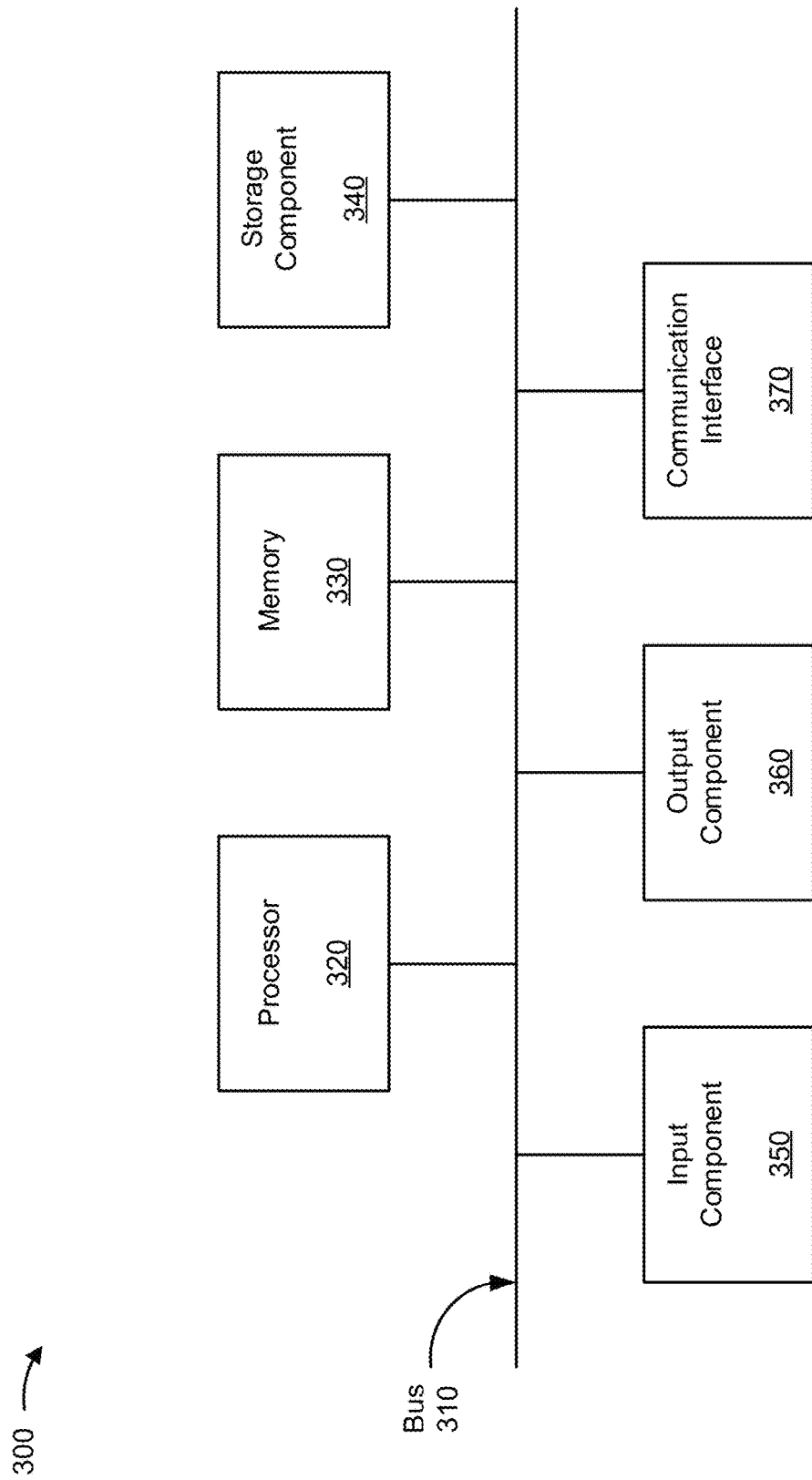
FIG. 3 is a diagram of example components of one or more devices of FIG. 2.

FIG. 3 is a diagram of example components of a device 300. Device 300 may correspond to facility analytics platform 205, cloud computing environment 210, computing resource 215, client device 220, image capture system 225, and/or server device 230. In some implementations, facility analytics platform 205, cloud computing environment 210, computing resource 215, client device 220, image capture system 225, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for tracking and/or analyzing facility-related activities. In some implementations, one or more process blocks of FIG. 4 may be performed by facility analytics platform 205. In some implementations, one or more process blocks of FIG. 4 may be performed by another device or a group of devices separate from or including facility analytics platform 205, such as computing resource 215, client device 220, image capture system 225, and server device 230.

As shown in FIG. 4, process 400 may include receiving images of a maintenance facility from an image capture system (block 410). For example, facility analytics platform 205 may receive images of a maintenance facility from an image capture system. In some implementations, facility analytics platform 205 may receive the image periodically, according to a schedule, based on requesting the image, and/or the like.

In some implementations, facility analytics platform 205 may receive thousands, millions, etc. of images from hundreds, thousands, etc. of cameras associated with image capture system 225. In this way, facility analytics platform 205 may receive a set of images that cannot be processed manually or objectively by a human actor. In some implementations, cameras associated with image capture system 225 may be located above an area of a facility (e.g., a vehicle maintenance area of a maintenance facility). This permits plan view tracking of individuals, objects, or activities in a facility (e.g., tracking from above an area rather than tracking from a side view or an elevation view, such as a view from the front of an area). In addition, this permits plain view tracking of individuals, objects, or activities in a facility, thereby reducing or eliminating a need for use of manual monitoring of video from a camera, use of RFID tags, and/or the like.

In some implementations, the images may include video (e.g., multiple images that appear to form continuous motion, a video stream, etc.) and facility analytics platform 205 may receive the video. In some implementations, facility analytics platform 205 may receive an image in real-time or near real-time (e.g., as the image is captured by image capture system 225).

In some implementations, an image may be of a maintenance facility. For example, an image may be of a facility where maintenance activities are performed on a vehicle, equipment, and/or the like by workers. In some implementations, an image may show objects in the maintenance facility (e.g., vehicles, equipment, tools, work gear associated with a worker, etc.), workers in the facility, activities being carried out in the maintenance facility (e.g., maintenance activities, movement through the maintenance facility, etc.).

In some implementations, facility analytics platform 205 may receive other data (e.g., from server device 230). In some implementations, the data may relate to work schedules of workers associated with the maintenance facility, work orders related to maintenance to be performed at the maintenance facility, historical data related to maintenance activities (e.g., an amount of time needed to perform a maintenance activity, a frequency of performing a maintenance activity, etc.), a maintenance schedule for equipment, and/or the like. In some implementations, facility analytics platform 205 may use the data when analyzing workers, objects, activities, and/or the like, as described in more detail elsewhere herein.

In this way, facility analytics platform 205 may receive an image prior to processing the image.

As further shown in FIG. 4, process 400 may include processing the images to identify a worker in the maintenance facility, an activity being performed in the maintenance facility, and/or an object in the maintenance facility (block 420). For example, facility analytics platform 205 may process the images. In some implementations, facility analytics platform 205 may process the images to identify a set of workers in a maintenance facility, a set of activities being performed in the maintenance facility (e.g., movement of an object, use of a tool, movement of a worker, etc.), and/or a set of objects in the maintenance facility (e.g., a tool, a vehicle, equipment, etc.). In some implementations, facility analytics platform 205 may process an image to perform an analysis of workers, activities, and/or objects. In some implementations, facility analytics platform 205 may process thousands, millions, billions, etc. of data elements. In this way, facility analytics platform 205 may process a data set that cannot be processed manually or objectively by a human actor.

In some implementations, facility analytics platform 205 may process an image using a technique to identify text in an image (e.g., of a license plate, of a serial number, of an identification badge, etc.), objects or people shown in an image, activities shown in an image, and/or the like. For example, facility analytics platform 205 may use an image processing technique, such as a fuzzy logic image processing technique, a computer vision technique, a shape detection technique, a technique that includes use of a color histogram, a motion detection technique, and/or the like to process an image (e.g., where the facility analytics platform 205 has been trained to identify objects, people, activities, etc. in images and/or video). As a specific example, a hard hat worn by an individual in a facility may include a color histogram, and facility analytics platform 205 may identify the hard hat, or an individual wearing the hard hat, by identifying the color histogram of the hard hat.

In some implementations, facility analytics platform 205 may process an image to correct for distortion, warping, edge bending, and/or the like (e.g., that is a result of an angle of a camera relative to a worker, an object, and/or an activity in a maintenance facility) to improve processing of an image. For example, facility analytics platform 205 may use a technique such as an image geometry correction technique when processing an image.

In some implementations, facility analytics platform 205 may normalize images from different cameras when processing the images. For example, cameras may be positioned at different heights (e.g., on a wall, above a floor, from a ceiling, etc.), may have different degrees of angle, may have overlapping fields of view, and/or the like and facility analytics platform 205 may normalize images from the cameras to permit facility analytics platform 205 to identify objects, activities, and/or individuals in images from different cameras and/or to map identified objects, activities, and/or individuals to map of a facility. In some implementations, facility analytics platform 205 may normalize images from different cameras using information that identifies a height of the cameras, an angle of the cameras relative to areas at which the cameras are pointed, a location of the cameras (e.g., a geographic location), a size of a field of view of the cameras, and/or the like.

In some implementations, facility analytics platform 205 may process an image to identify an object (e.g., may identify an object on which a maintenance activity is being performed, a tool being used to perform a maintenance activity, particular types of an object, etc.). In some implementations, facility analytics platform 205 may process an image to identify a shape, a color, a size, etc. of an object in the image. For example, facility analytics platform 205 may identify an object using a computer vision technique, a shape detection technique, a feature extraction technique, and/or the like. Continuing with the previous example, facility analytics platform 205 may use an image processing technique to identify a shape that corresponds to a particular type of equipment in a maintenance facility, a tool being used by a worker, and/or the like.

In some implementations, facility analytics platform 205 may process an image to identify an identifier shown in the image to verify identification of an object. For example, facility analytics platform 205 may use an optical character recognition (OCR) technique to identify an identifier (e.g., a license plate number, a serial number, etc.) on an object in the maintenance facility. Continuing with the previous example, facility analytics platform 205 may perform a lookup of an identifier to confirm identification of the object and/or may use information related to scheduled maintenance to verify identification of an object (e.g., where a result of the lookup indicates a match). In this case, facility analytics platform 205 may provide information to client device 220 when the result indicates a mismatch (e.g., to permit a user of client device 220 to manually verify identification of the object).

In some implementations, facility analytics platform 205 may process an image to identify a worker, or other individual such as a supervisor, within a maintenance facility. In some implementations, facility analytics platform 205 may identify a worker based on a characteristic related to a worker, such as a shape, a color, a skin color, a height, a hair color, and/or the like of the worker and/or a uniform of the worker. As an example, facility analytics platform 205 may process an image to identify a hard hat shown in the image (e.g., based on a shape, a color, etc. of the hard hat). In this way, facility analytics platform 205 permits identification of individual workers (e.g., by identifying hats worn by the individual workers), such as when a group of workers is standing within proximity to each other, thereby improving individual tracking of workers. Additionally, or alternatively, and as another example, facility analytics platform 205 may identify, or confirm identification of, a worker by identifying other characteristics of the worker and/or a uniform of the worker (e.g., by identifying a color of a uniform, by detecting arms, legs, shoulders, a face, etc. in an image, by confirming identification of the individual in images from the same or different cameras, etc.).

Additionally, or alternatively, and as another example, facility analytics platform 205 may identify a particular worker in an image by using a facial recognition technique, by identifying characteristics of a worker in an image (e.g., by identifying a color pattern of a uniform, skin tone, protective gear, etc. of a worker in an image, a size of a worker in an image, etc.), detecting a worker identifier (e.g., an employee identification number that identifies a worker) in an image, a unique pattern on a uniform, gait of a worker, and/or the like. Continuing with the previous example, facility analytics platform 205 may verify identification of a worker by performing a comparison of information identifying a worker identified in an image and information related to a work schedule, an entrance log of a maintenance facility, and/or the like, and may verify the identification where a result of the comparison indicates a match. In this way, facility analytics platform 205 may uniquely identify each individual in a facility.

In some implementations, a pattern may be a unique pattern placed on an object to permit facility analytics platform 205 to uniquely identify the object, an individual associated with the object, and/or an activity associated with the object. For example, a pattern may be placed on a hard hat of a particular individual to permit facility analytics platform 205 to uniquely identify the hard hat and/or an individual wearing the hard hat.

In some implementations, facility analytics platform 205 may process the image to identify an activity (e.g., a maintenance activity, movement of a worker and/or an object, etc.). For example, facility analytics platform 205 may identify a maintenance activity by detecting a combination of a tool and a worker (e.g., by detecting a tool in a worker's hand using a shape detection technique, a feature extraction technique, etc.). Additionally, or alternatively, and as another example, facility analytics platform 205 may detect a maintenance activity shown in an image by detecting particular motion in multiple images (e.g., using a motion feature extraction technique). Additionally, or alternatively, and as another example, facility analytics platform 205 may detect a maintenance activity shown in an image by detecting a combination of a worker, a tool, and/or a particular motion a threshold distance from an identified object (e.g., where the work has a particular tool in hand and is proximate to equipment).

In some implementations, facility analytics platform 205 may confirm identification of an activity identified in an image and/or may use other information to increase an accuracy of identification of an activity. For example, facility analytics platform 205 may use data related to a maintenance facility that identifies scheduled maintenance activities for equipment to assist facility analytics platform 205 in identifying motion shown in an image (e.g., by causing facility analytics platform 205 to search for particular features associated with the scheduled maintenance activities) and/or to confirm an activity identified in an image. This improves a result of identifying an activity in an image by permitting confirmation of an activity identified in an image and/or conserves processing resources of facility analytics platform 205 by reducing or eliminating a need for facility analytics platform 205 to process an image in an unguided manner.

In some implementations, facility analytics platform 205 may track an object, a worker, and/or an activity across multiple images from different cameras (e.g., different cameras that are capturing portions of the same area of the maintenance facility, as an object and/or a worker moves through the maintenance facility, etc.). For example, facility analytics platform 205 may identify a worker in multiple images by identifying the same identifier in multiple images, by identifying a particular color pattern associated with a hard hat in multiple images, by identifying a face of a worker in multiple images using a facial recognition technique, and/or the like. In this way, by using a combination of features to identify a worker and/or an object, facility analytics platform 205 may improve an accuracy of tracking a worker, an object, and/or an activity across multiple images.

In addition, tracking an object, a worker, and/or an activity across multiple images improves an accuracy of processing an image by permitting facility analytics platform 205 to compare results of processing images of the same area in a maintenance facility, thereby conserving processing resources of facility analytics platform 205 that would otherwise be consumed from less accurate processing. For example, facility analytics platform 205 may tally results of processing different images and may identify a result with the highest tally relative to other results, weight results of processing multiple images, and/or the like when identifying a worker, an object, and/or an activity.

In some implementations, facility analytics platform 205 may map an identified worker, object, and/or activity to a map of a maintenance facility. For example, facility analytics platform 205 may determine a location using information that identifies a location of a camera of image capture system 225, an angle of a camera of image capture system 225, information that identifies a known location of a fixture in an image (e.g., a location of a maintenance bay), and/or the like to determine a location of a worker, an object, and/or an activity within a maintenance facility.

Continuing with the previous example, facility analytics platform 205 may combine information from multiple cameras to improve an accuracy of determining a location (e.g., by determining an average location calculated from multiple images, weighting a location from a particular camera more than another camera, etc.). In some implementations, facility analytics platform 205 may use the map when performing an analysis (e.g., to track movement of a worker and/or an object through the maintenance facility, to identify bottlenecks in the maintenance facility, etc.), as described in more detail elsewhere herein.

In some implementations, facility analytics platform 205 may identify the same individual, object, and/or activity in multiple images from different cameras using information that identifies a location of the individual, the object, or the activity when mapped to a facility map. For example, facility analytics platform 205 may use timestamps of images and information identifying a location of the cameras that captured the images to identify images of the same location (or that show an overlapping area). Continuing with the previous example, when analyzing multiple images different cameras, if facility analytics platform 205 identifies the same object, individual, or activity within a threshold distance when mapped to a facility map and within a threshold amount of time based on timestamps, facility analytics platform 205 may determine that the multiple images show the same object, individual, or activity. This permits tracking of an object, an individual, or an activity across multiple images (e.g., from different cameras), deduplication of images that show the same object, activity, or individual, and/or the like.

In some implementations, facility analytics platform 205 may have been trained on a training set of data (e.g., using machine learning, artificial intelligence, and/or the like). For example, the training set of data may include an image of an object, a worker, and/or an activity and various tags that identify the image as showing a worker, an object, and/or an activity. In some implementations, the training set of data may include hundreds, thousands, millions, etc. of data elements and/or images. In some implementations, the training set of data may be processed (e.g., prior to being used to train facility analytics platform 205). For example, an image included in the training set of data may be processed using an image processing and/or augmentation technique to reduce blur in the image, to sharpen the image, to crop the image, to rotate the image, and/or the like. Additionally, or alternatively, and as another example, a data element may be processed to format the data element, to aggregate the data element with another data element, and/or the like.

In some implementations, facility analytics platform 205 may receive a trained model from another device (e.g., server device 230), rather than being trained. Additionally, or alternatively, facility analytics platform 205 may be trained in a guided manner. For example, a user of facility analytics platform 205 may manually verify and/or correct a result of facility analytics platform 205 processing an image. In this case, facility analytics platform 205 may use user input related to verifying and/or correcting a result of processing an image to improve future processing.

In some implementations, facility analytics platform 205 may determine a score. For example, facility analytics platform 205 may determine a score that indicates a confidence level or a likelihood that an identified object, worker, and/or activity is correctly identified. In some implementations, facility analytics platform 205 may determine a score based on a degree to which an identified worker, object, and/or activity matches a training image, based on input from a user of facility analytics platform 205, based on image data from multiple images, based on other information (e.g., information related to scheduled maintenance for equipment and/or a work schedule for a worker), and/or the like.

In some implementations, facility analytics platform 205 may determine a score using a result of processing multiple images. For example, facility analytics platform 205 may determine an average score of scores associated with multiple images, a weighted score for multiple images, the highest score relative to other scores for multiple images, and/or the like. As another example, facility analytics platform 205 may use a score associated with a first image to confirm and/or adjust a score associated with a second image (e.g., by determining whether scores for the first and second images differ by a threshold amount). In some implementations, facility analytics platform 205 may use other information to confirm and/or adjust a score. For example, facility analytics platform 205 may receive, from server device 230, information related to scheduled maintenance for equipment and/or a work schedule for a worker to confirm identification of a worker, an object, and/or an activity (e.g., by determining whether an identified worker is scheduled to perform an identified maintenance activity on particular equipment).

In this way, facility analytics platform 205 may process the image prior to performing an analysis of a worker, the activity, and/or the object identified in the image.

As further shown in FIG. 4, process 400 may include performing an analysis of the worker, the activity, and/or the object in the maintenance facility (block 430). For example, facility analytics platform 205 may perform an analysis of the worker, the activity, and/or the object in the maintenance facility. In some implementations, facility analytics platform 205 may perform the analysis to identify underperforming operations of a maintenance facility. In some implementations, facility analytics platform 205 may perform an analysis of thousands, millions, billions, etc. of data elements, in real-time or near real-time, when performing an analysis. In this way, facility analytics platform 205 may analyze a data set that cannot be analyzed manually or objectively by a human actor.

In some implementations, facility analytics platform 205 may perform an analysis after confirming a result of processing an image. For example, facility analytics platform 205 may confirm a result of processing an image using information related to a maintenance facility (e.g., information related to a work schedule, information related to scheduled maintenance, etc.), as described elsewhere herein. This improves an accuracy of performing an analysis of data (e.g., by reducing or eliminating erroneous processing of an image), thereby conserving processing resources that would otherwise be consumed using a less accurate result.

In some implementations, facility analytics platform 205 may perform an analysis related to a set of workers identified in a set of images of the maintenance facility. For example, facility analytics platform 205 may analyze movement of a worker in the maintenance facility and around an object (e.g., equipment on which the worker is scheduled to perform maintenance activities). Continuing with the previous example, facility analytics platform 205 may determine whether a worker is leaving a work area for a threshold amount of time, whether a worker makes multiple trips to a parts area during a time period, whether a worker moves around an object during maintenance in an efficient manner (e.g., in a general direction with a threshold quantity of changes in direction, at a threshold speed, etc.), and/or the like (e.g., based on mapping movement of the worker to a map).

Additionally, or alternatively, and as another example, facility analytics platform 205 may analyze an amount of time a worker spends performing a particular task. Continuing with the previous example, facility analytics platform 205 may determine whether an amount of time that a worker spends performing a particular task satisfies a threshold, whether an amount of time for a task exceeds an average amount of time for the worker or for other workers (e.g., by a threshold amount), may identify tasks that take a threshold amount of time on average (e.g., indicating that the task is a bottleneck task), and/or the like. Additionally, or alternatively, and as another example, facility analytics platform 205 may analyze a location of a worker. Continuing with the previous example, facility analytics platform 205 may determine whether the worker is in an assigned location (e.g., a maintenance bay), whether a threshold quantity of workers is in a particular area (e.g., indicating that too many workers are in a particular area and/or are engaged in a particular activity), and/or the like.

Additionally, or alternatively, and as another example, facility analytics platform 205 may determine an amount of time needed to perform an activity. For example, facility analytics platform 205 may determine an amount of time needed to perform an activity based on historical data (e.g., to permit facility analytics platform 205 to monitor and/or analyze activities currently being performed in a facility), based on tracking activities in a facility (e.g., to permit facility analytics platform 205 to determine an average amount of time for an activity, to improve generation of a schedule, etc.).

Additionally, or alternatively, and as another example, facility analytics platform 205 may analyze a quality of work performed by a worker. Continuing with the previous example, facility analytics platform 205 may determine whether an object is returned to a worker after a quality review (e.g., whether an object is returned to a maintenance bay of the worker after being tested in a different area of the maintenance facility), whether an object is returned to a maintenance facility for the same maintenance within a threshold amount of time from when a worker performed the maintenance activity, and/or the like.

In some implementations, facility analytics platform 205 may perform an analysis related to an activity being performed within a maintenance facility and identified in an image. For example, facility analytics platform 205 may analyze utilization of a maintenance bay. Continuing with the previous example, facility analytics platform 205 may determine a percentage of time during working hours that a maintenance bay is being used, whether an amount of time that a maintenance bay is being used satisfies a threshold, an average amount of time maintenance bays across the maintenance facility are being used, types of maintenance activities for which a maintenance bay is being used, whether a schedule is on-time for a maintenance bay or across maintenance bays based on activities being performed at the maintenance bay or across the maintenance bays, and/or the like.

Additionally, or alternatively, and as another example, facility analytics platform 205 may analyze particular activities. For example, facility analytics platform 205 may determine whether the activities are satisfying a schedule (e.g., are on-time, match a work order, etc.), an amount of time workers are spending performing the activities across maintenance bays and whether the amount of time satisfies a threshold, whether scheduled activities are being performed with respect to an object, whether activities in a maintenance bay are being performed in a particular manner (e.g., in a particular order, according to a checklist, etc.), and/or the like.

In some implementations, facility analytics platform 205 may perform an analysis related to an object in a maintenance facility. For example, facility analytics platform 205 may track movement of an object through the maintenance facility (e.g., on a map). Continuing with the previous example, facility analytics platform 205 may determine whether an object has been moved to a scheduled location (e.g., whether movement of the object satisfies a schedule), whether an object is moved between the same areas a threshold quantity of times (e.g., between a maintenance bay and a quality assurance bay, thereby indicating poor performance of maintenance activities), whether an object has moved a threshold distance or has spent a threshold amount of time in transit between different portions of the maintenance facility (e.g., thereby indicating a bottleneck in a maintenance facility, inefficient movement in a maintenance facility, deviation from a scheduled route through the maintenance facility, etc.), and/or the like.

In some implementations, facility analytics platform 205 may determine a score. For example, facility analytics platform 205 may determine a score for a worker, an activity, and/or an object. In some implementations, the score may indicate a result of performing an analysis. For example, a score may indicate whether a worker is performing particular activities for a threshold amount of time during a work day, whether a maintenance bay is being utilized for a threshold amount of time during a work day, whether maintenance on an object is progressing according to a schedule, and/or the like.

In this way, facility analytics platform 205 may perform an analysis prior to performing an action based on a result of the analysis.

As further shown in FIG. 4, process 400 may include performing an action based on a result of the analysis (block 440). For example, facility analytics platform 205 may perform an action. In some implementations, facility analytics platform 205 may perform an action based on a result of the analysis. In some implementations, facility analytics platform 205 may perform multiple actions (e.g., simultaneously or in parallel) may perform an action within a threshold amount of time after analyzing information (e.g., in real-time or near real-time), and/or the like. In this way, facility analytics platform 205 may perform a set of actions that cannot be performed manually or objectively by a human actor. In some implementations, an action may positively impact operations of the maintenance facility.

In some implementations, facility analytics platform 205 may perform an action to schedule a meeting related to a result of performing an analysis (e.g., by using electronic calendars associated with supervisors of the maintenance facility and identifying an available time for the meeting). Additionally, or alternatively, facility analytics platform 205 may perform an action to send a message (e.g., to client device 220) that includes information identifying a result of performing an analysis, that includes a notification to a supervisor regarding a result of performing an analysis, and/or the like.

Additionally, or alternatively, facility analytics platform 205 may perform an action to generate a report (e.g., that includes information that identifies a result of performing an analysis). Additionally, or alternatively, facility analytics platform 205 may perform an action to generate a recommendation (e.g., to minimize movement of workers to un-assigned areas of the maintenance facility, to minimize an amount of time that a maintenance bay is empty or not being utilized, to provide training to a particular worker, etc.). Additionally, or alternatively, facility analytics platform 205 may perform an action to determine a result of implementing a recommendation (e.g., by comparing a result of an analysis prior to implementing a recommendation and a result of an analysis after a recommendation has been implemented).

Additionally, or alternatively, facility analytics platform 205 may perform an action to generate a maintenance schedule for a maintenance facility (e.g., based on data related to an amount of time for performing particular maintenance activities, workers scheduled to perform the maintenance activities, etc.). For example, facility analytics platform 205 may adjust a maintenance schedule in real-time and may send a message to a supervisor identifying the adjustment and/or a cause of the adjustment. Additionally, or alternatively, and as another example, facility analytics platform 205 may send a message to client device 220 associated with a worker to report to the maintenance facility at a particular time (e.g., due to maintenance activities being delayed or due to a lack of workers to perform maintenance activities).

Additionally, or alternatively, facility analytics platform 205 may perform an action to store information related to a result of performing an analysis. For example, facility analytics platform 205 may store information to improve future analyses, to identify a trend or a pattern in the information over time, and/or the like.

In some implementations, facility analytics platform 205 may perform an action based on a score. For example, facility analytics platform 205 may perform a first action when a score satisfies a first threshold and may perform a second action when a score satisfies a second threshold. Continuing with the previous example, when a first score indicates a first turnaround time for a maintenance bay, facility analytics platform 205 may send a message to client devices 220 associated with workers associated with the maintenance bay and when a second score indicates a second turnaround time (e.g., a slower turnaround time relative to the first turnaround time), facility analytics platform 205 may send a message to client device 220 associated with a supervisor associated with the maintenance bay. In this way, facility analytics platform 205 may perform varying degrees of actions.

In some implementations, facility analytics platform 205 may communicate with one or more systems. For example, facility analytics platform 205 may communicate with a time reporting system, a maintenance planning system, a point-of-sale system, an operations support system, a customer relationship management (CRM) system, and/or the like. In some implementations, facility analytics platform 205 may use a result of an analysis to update the one or more systems (e.g., adjust information identifying time reported by an individual, adjust a schedule based on delays in a facility, etc.). This improves operations of the facility by improving data in systems that the organization uses. In addition, this conserves processing resources of the systems that would otherwise be consumed based on using less accurate data.

In this way, facility analytics platform 205 may perform an action based on a result of the analysis.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show examples of various reports that facility analytics platform 205 may generate.

Figure 5A:
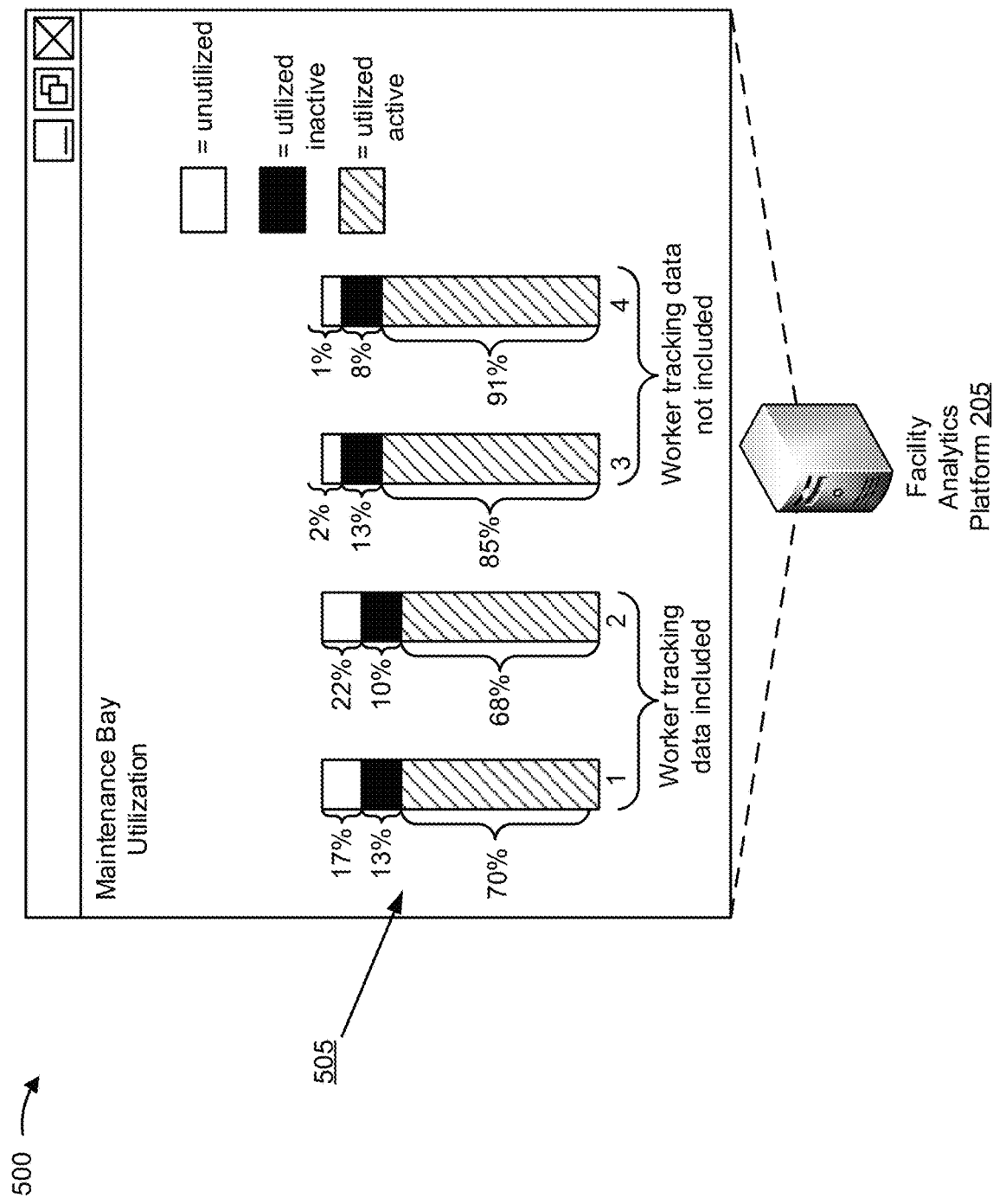

FIG. 5A shows an example report related to utilization of maintenance bays in a maintenance facility. In some implementations, facility analytics platform 205 may generate the report after performing an analysis of information related to the maintenance facility. As shown by reference number 505, the report may include information that identifies an amount of time (e.g., during a work day, during a month, during a shift, etc.) that a maintenance bay is being utilized in an active manner (e.g., maintenance work is being performed on equipment), being utilized in an inactive manner (e.g., when a maintenance bay is occupied by equipment, but maintenance work is not being performed on the equipment), and/or is unutilized (e.g., is empty).

In some implementations, the report may group information included in the report based on a type of data that was included in an analysis of information related to the maintenance bays. For example, facility analytics platform 205 may group information related to maintenance bays based on whether worker tracking data (e.g., data related to movements of workers) was included in an analysis of information related to the maintenance bays. This report may permit facility analytics platform 205 and/or a user of facility analytics platform 205 to identify underutilized and/or over utilized maintenance bays in a maintenance facility.

Figure 5B:
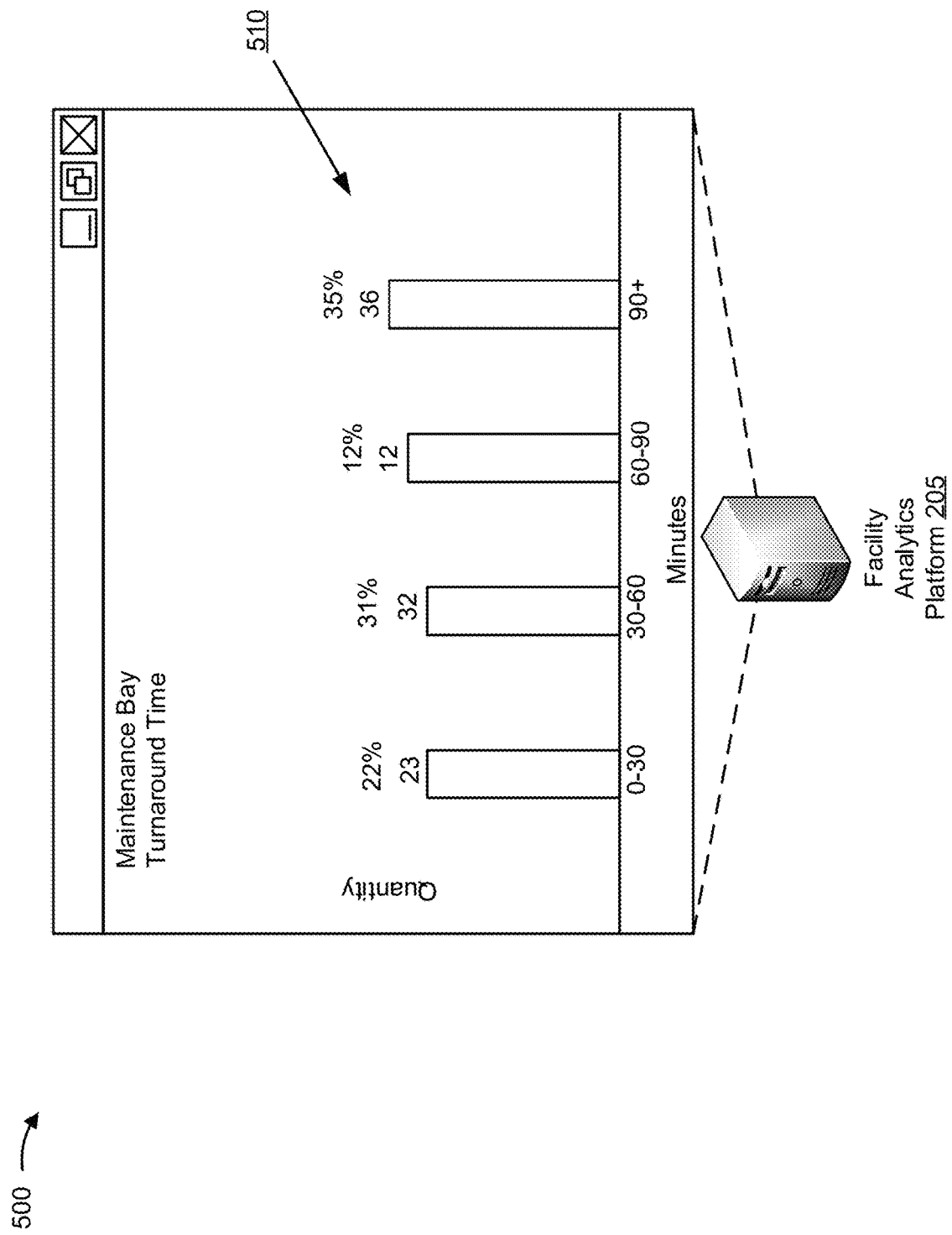

FIG. 5B shows an example of a report related to a turnaround time of maintenance bays in a maintenance facility (e.g., an amount of time to complete maintenance activities on equipment). In some implementations, facility analytics platform 205 may generate the report after performing an analysis of information related to the maintenance facility. As shown by reference number 510, the report may include information that identifies various ranges of turnaround times for a maintenance bay and a quantity of maintenance bays that have a turnaround time within each of the ranges of turnaround times. This report may permit facility analytics platform 205 and/or a user of facility analytics platform 205 to identify maintenance bays that have a turnaround time that exceeds a threshold, trends related to turnaround times for maintenance bays in a maintenance facility, underperforming maintenance bays (e.g., underperforming maintenance crews), and/or the like.

Figure 5C:
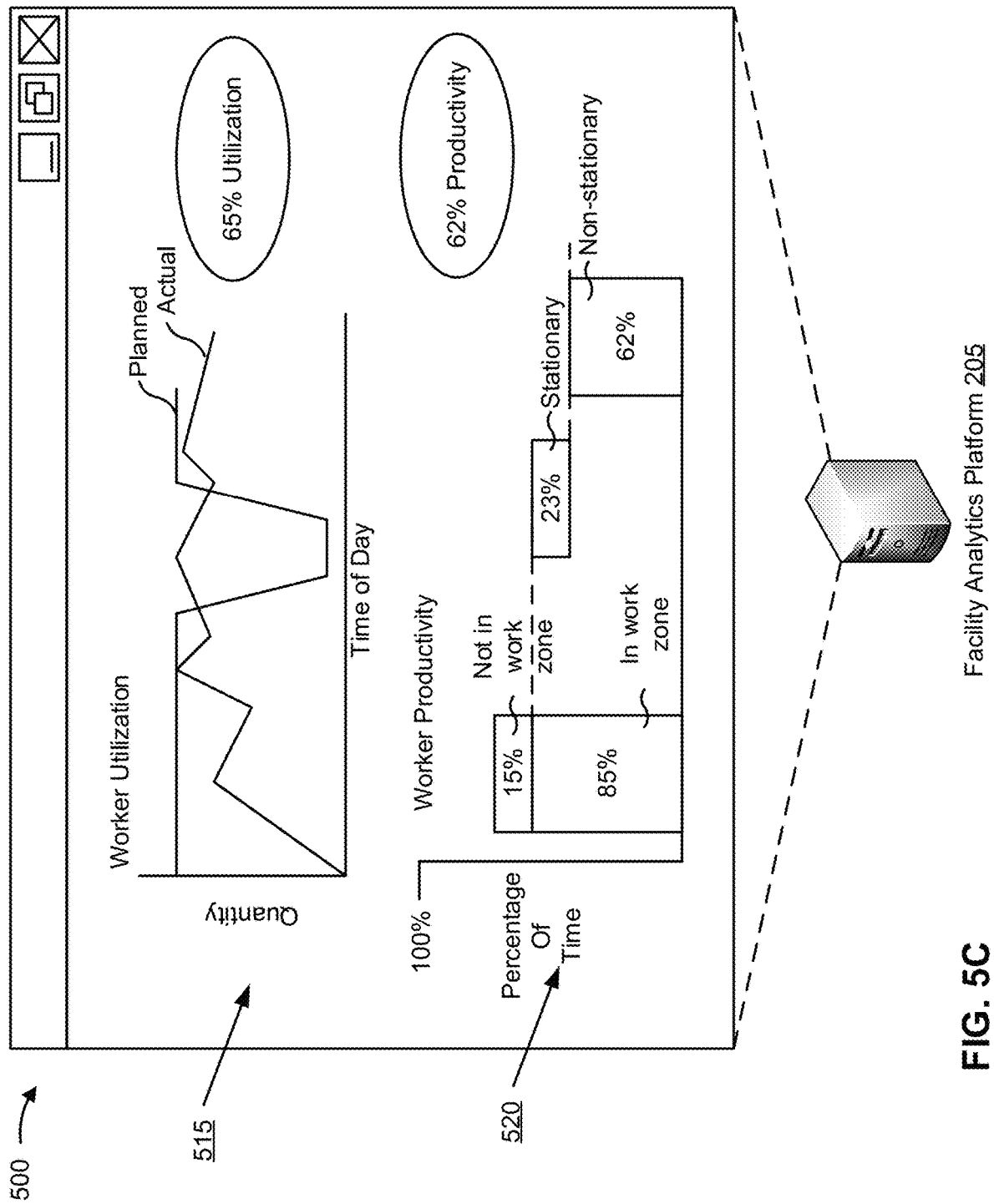

FIG. 5C shows an example report related to worker utilization (e.g., an amount of time during a work day, a month, a shift, etc. that a worker spends working, such as performing maintenance activities). As shown by reference number 515, the report may include information that identifies worker utilization. For example, the report may include information that identifies a quantity of workers planned for a shift, for a maintenance bay, for a particular task, and/or the like, and an actual quantity of workers that were utilized. As shown by reference number 520, the report may further include information identifying worker productivity (e.g., during a work day, a particular shift, a particular month, a particular time period, etc.). For example, the report may include information that identifies a percentage of time that a set of workers are in or not in a work zone (e.g., a maintenance bay, a threshold distance from equipment, etc.), are stationary (e.g., indicating that the set of workers is not working), are non-stationary (e.g., moving, thereby indicating the set of workers are working), and/or the like. This report may permit facility analytics platform 205 and/or a user of facility analytics platform 205 to identify under or over utilization of workers, unproductive workers, and/or the like.

Figure 5D:
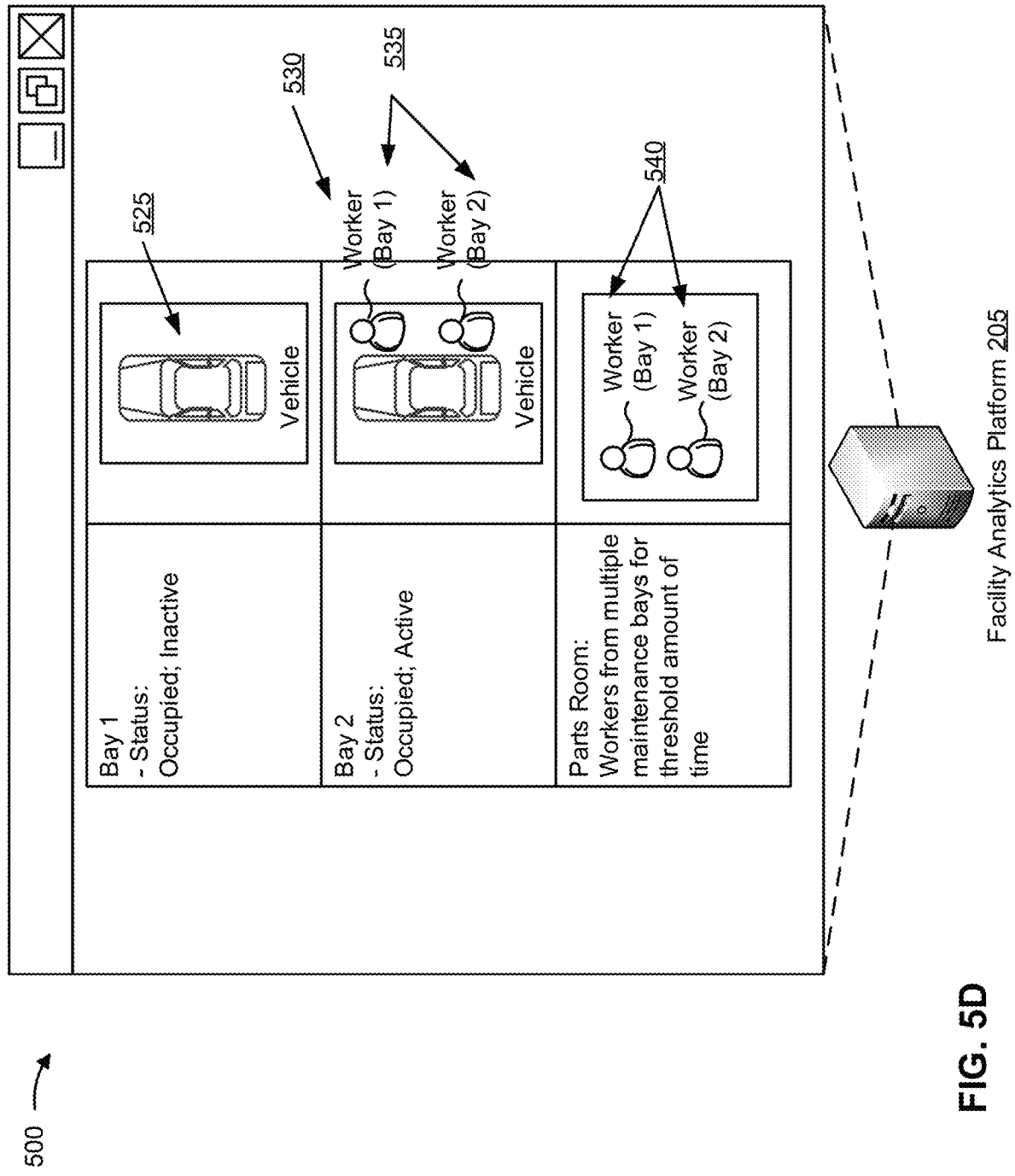

FIG. 5D shows an example report related to locations of workers within a maintenance facility relative to, for example, a maintenance bay (or other assigned/scheduled location of the worker). As shown by reference number 525, the report may include information that identifies maintenance bays that are occupied but inactive (e.g., maintenance bays where no workers are present, maintenance bays where workers are present but are not working, etc.). Additionally, or alternatively, and as shown by reference number 530, the report may include information that identifies maintenance bays that are occupied and active (e.g., maintenance bays where workers are preset and/or are working).

In some implementations, and as shown by reference number 535, the report may include information identifying assigned locations (e.g., maintenance bays) of workers located in a particular maintenance bay. For example, and as shown, the report may identify that a worker assigned to maintenance bay 1 is located in maintenance bay 2 (e.g., indicating that the worker is in an unassigned/unscheduled location). In this case, facility analytics platform 205 may send a notification to client device 220 associated with a supervisor and/or the worker indicating that the worker is in an unassigned/unscheduled location. As shown by reference number 540, the report may include information that identifies when a worker is in an unassigned/unscheduled but permitted area, such as a parts room, for a threshold amount of time (e.g., indicating that the worker may be wasting time). This report may permit facility analytics platform 205 and/or a user of facility analytics platform 205 to identify a worker that has been requested to perform an unscheduled consult at another maintenance bay, that is socializing during work time, and/or the like.

FIG. 5E shows an example of a report related to movements of a worker around equipment (e.g., a vehicle) on which the worker is performing maintenance activities. As shown by reference number 545, the report may include information that identifies a worker that moves in the same general direction around a vehicle while performing maintenance on the vehicle (e.g., indicating that the worker worked in an efficient manner, such as by performing maintenance activities in an organized manner, without being distracted or leaving a work area, by following a checklist, by focusing on one maintenance issue at a time, etc.). As shown by reference number 550, the report may include information identifying a worker that has not moved in the same general direction around a vehicle while performing maintenance activities on the vehicle.

This may indicate that the worker performed maintenance activities inefficiently, performed maintenance activities in a disorganized manner, did not follow a checklist while performing maintenance activities, was distracted while performing maintenance activities, and/or the like. In some implementations, this report may permit facility analytics platform 205 and/or a user of facility analytics platform 205 to identify a worker that is working inefficiently, a worker that may need additional supervision during a shift, a worker that may need additional training, and/or the like (e.g., in real-time or near real-time).

As indicated above, FIGS. 5A-5E are provided merely as an example. Other examples are possible and may differ from what was described with regard to FIGS. 5A-5E.

Although described with respect to a maintenance facility, the implementations described herein apply equally to other contexts. For example, the implementations apply equally to other types of facilities, such as a manufacturing facility (e.g., workers on an assembly line, products being assembled, assembly stations, etc.), a shipping facility (e.g., workers loading trucks with packages, fork lifts used to move packages, etc.), other types of individuals and/or objects than those described herein, and/or the like.

Some implementations, described herein, provide a facility analytics platform that is capable of capturing images and/or video of operations of a maintenance facility and analyzing the operations. In this way, the facility analytics platform may analyze activities, human resources, and/or non-human resources related to a maintenance facility to analyze an effectiveness of operations of the maintenance facility and/or deployment of resources of the maintenance facility. This improves an accuracy of an analysis of operations and/or resources related to a maintenance facility, thereby conserving processing resources that would otherwise be consumed via a less accurate analysis. In addition, this improves utilization of resources of a maintenance facility, via improved operations of the maintenance facility, thereby reducing waste and/or inefficient consumption of resources of the maintenance facility. Further, this improves throughput of the maintenance facility, thereby improving operations of the maintenance facility.

Although some implementations were described herein with reference to particular objects, types of individuals, types of facilities, or types of activities, the implementations apply equally to other contexts. For example, references to vehicles, equipment, activities, and/or particular facilities apply equally to other contexts, such as other types of objects (e.g., trailers, components used in manufacturing, etc.), locations that include intellectual property (e.g., a movie set or a laboratory), outdoor locations (e.g., a refinery, an excavation location, a market, or a lumber yard), other indoor locations (e.g., a retail location or an office), other types of individuals (e.g., contractors, customers, employees, or supervisors), and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive video of a maintenance facility from an image capture system,
      the video showing at least one of:
         an individual within the maintenance facility,
         equipment within the maintenance facility on which the individual is to perform a maintenance activity, or
         an activity being performed within the maintenance facility;
   process the video using a video or image processing technique to identify the individual, the equipment, or the activity,
      where the one or more processors, when processing the video, are to:
         process the video to identify a set of characteristics associated with the individual;
   track the individual, the equipment, or the activity through the video of the maintenance facility to facilitate an analysis of the individual, the equipment, or the activity,
      where the one or more processors, when tracking the individual, the equipment, or the activity are to:
         track the individual in the video based on the set of characteristics associated with the individual;
   perform the analysis of the individual, the equipment, or the activity using information related to tracking the individual, the equipment, or the activity,
      the analysis to identify underperforming operations of the maintenance facility; and
   perform an action related to the individual, the equipment, or the activity based on a result of the analysis,
      the action to positively impact operations of the maintenance facility.

2. The device of claim 1, where the one or more processors are further to:
   map information identifying the individual, the equipment, or the activity to a map of the maintenance facility after tracking the individual, the equipment, or the activity; and
   where the one or more processors, when performing the analysis, are to:
      perform the analysis using a result of mapping the information identifying the individual, the equipment, or the activity to the map of the maintenance facility.

3. The device of claim 1, where:
   the equipment comprises a vehicle, and
   the activity comprises the maintenance activity.

4. The device of claim 1, where the one or more processors are further to:
   identify the equipment by identifying a license plate of the equipment,
      the equipment being a vehicle.

5. The device of claim 1, where the one or more processors are further to:
   identify the activity based on at least one of:
      a tool shown in the video,
      particular motion shown in the video, or
      the video showing that the individual is a threshold distance from the equipment; and
   where the one or more processors, when performing the analysis, are to:
      perform the analysis after identifying the activity.

6. The device of claim 1, where:
   the video is received from one or more video cameras,
      the one or more video cameras being located above a vehicle maintenance area of the maintenance facility to permit plan view tracking of the individual, the equipment, or the activity.

7. The device of claim 1, where the one or more processors are further to at least one of:
   identify a location of the equipment after processing the video, or
   identify a location of the individual after processing the video.

8. A method, comprising:
   receiving, by a device, an image of a maintenance facility from an image capture system,
      the image depicting:
         an individual within the maintenance facility,
         equipment within the maintenance facility on which the individual is to perform a maintenance activity, or
         an activity being performed within the maintenance facility;
   processing, by the device, the image using an image processing technique to identify the individual, the equipment, or the activity,
      where processing the image comprises:
         processing the image to identify a set of characteristics associated with the individual;

tracking, by the device, the individual, the equipment, or the activity through multiple images of the maintenance facility to facilitate an analysis of the individual, the equipment, or the activity,
  where tracking the individual, the equipment, or the activity comprises:
    tracking the individual through the multiple images based on the set of characteristics associated with the individual;
performing, by the device, the analysis of the individual, the equipment, or the activity based on a result of tracking the individual, the equipment, or the activity, the analysis to identify underperforming operations of the maintenance facility; and
performing, by the device, an action related to the individual, the equipment, or the activity based on a result of the analysis,
  the action to positively impact operations of the maintenance facility.

9. The method of claim 8, where processing the image comprises:
  processing the image to identify a hard hat in the image;
  identifying the individual in the image after identifying the hard hat; and
  where tracking the individual, the equipment, or the activity comprises:
    tracking the individual through the multiple images after identifying the individual in the image.

10. The method of claim 8, where processing the image comprises:
  processing the image to identify at least one of:
    a license plate number on the equipment, or
    a serial number on the equipment; and
  where tracking the equipment comprises:
    tracking the equipment through the multiple images based on the at least one of:
      the license plate number, or
      the serial number.

11. The method of claim 8, further comprising:
  determining an amount of time needed to perform the activity after performing the analysis; and
  where performing the action comprises:
    performing the action after determining the amount of time needed to perform the activity.

12. The method of claim 8, where performing the analysis comprises:
  analyzing movement of the individual through the maintenance facility or around the equipment; and
  where performing the action comprises:
    performing the action after performing the analysis of the movement of the individual through the maintenance facility or around the equipment.

13. The method of claim 8, where performing the analysis comprises:
  analyzing utilization of a resource of the maintenance facility,
    the resource including a maintenance bay of the maintenance facility; and where performing the action comprises:
      performing the action after performing the analysis of the utilization of the resource.

14. The method of claim 8, where performing the analysis comprises:
  analyzing utilization of a resource of the maintenance facility,
    the resource including a maintenance bay of the maintenance facility; and
  where performing the action comprises:
    performing the action after performing the analysis of the utilization of the resource.

15. A non-transitory computer-readable medium storing instructions, the instructions comprising:
  one or more instructions that, when executed by one or more processors, cause the one or more processors to:
    receive one or more images of a maintenance facility, the one or more images showing:
      one or more individuals within the maintenance facility,
      one or more equipment within the maintenance facility, or
      one or more activities being performed within the maintenance facility;
    process the one or more images using one or more techniques to identify the one or more individuals in the maintenance facility, the one or more equipment in the maintenance facility, or the one or more activities being performed in the maintenance facility;
    track the one or more individuals, the one or more equipment, or the one or more activities through the maintenance facility;
    map information identifying the one or more individuals, the one or more equipment, or the one or more activities to a map of the maintenance facility based on a result of tracking the one or more individuals, the one or more equipment, or the one or more activities;
    perform one or more analyses of the one or more individuals, the one or more equipment, or the one or more activities after mapping the information to the map of the maintenance facility,
      the one or more analyses to identify operations of the maintenance facility; and
    perform one or more actions related to the one or more individuals, the one or more equipment, or the one or more activities based on one or more results of the one or more analyses,
      the one or more actions to positively impact the operations of the maintenance facility.

16. The non-transitory computer-readable medium of claim 15, where the one or more instructions, when executed by the one or more processors, further cause the one or more processors to:
  identify one or more identifiers associated with the one or more equipment based on a result of processing the one or more images;
  perform one or more lookups of the one or more identifiers to confirm identification of the one or more identifiers; and
  where the one or more instructions, that cause the one or more processors to perform the one or more analyses, cause the one or more processors to:
    perform the one or more analyses after performing the one or more lookups of the one or more identifiers.

17. The non-transitory computer-readable medium of claim 15, where the one or more instructions, that cause the one or more processors to perform the one or more analyses, cause the one or more processors to:
  determine whether the one or more activities are satisfying one or more schedules; and
  where the one or more instructions, that cause the one or more processors to perform the one or more actions, cause the one or more processors to:

perform the one or more actions after determining whether the one or more activities are satisfying the one or more schedules.

18. The non-transitory computer-readable medium of claim 15, where the one or more instructions, when executed by the one or more processors, further cause the one or more processors to:

uniquely identify each individual, of the one or more individuals, after processing the one or more images.

19. The non-transitory computer-readable medium of claim 15, where the one or more instructions, when executed by the one or more processors, further cause the one or more processors to:

identify an individual, of the one or more individuals, by identifying a hat worn by the individual.

20. The non-transitory computer-readable medium of claim 19, where:

the hat comprises a color histogram, and
the individual is identified by identifying the color histogram of the hat.

21. A method, comprising:

receiving, by a device, an image of a maintenance facility from an image capture system,
the image depicting:
an individual within the maintenance facility,
equipment within the maintenance facility on which the individual is to perform a maintenance activity, or
an activity being performed within the maintenance facility;
processing, by the device, the image using an image processing technique to identify the individual, the equipment, or the activity;
tracking, by the device, the individual, the equipment, or the activity through multiple images of the maintenance facility to facilitate an analysis of the individual, the equipment, or the activity;
performing, by the device, the analysis of the individual, the equipment, or the activity based on a result of tracking the individual, the equipment, or the activity, the analysis to identify underperforming operations of the maintenance facility;
determining an amount of time needed to perform the activity after performing the analysis; and
performing, by the device and after determining the amount of time needed to perform the activity, an action related to the individual, the equipment, or the activity based on a result of the analysis,
the action to positively impact operations of the maintenance facility.

22. A method, comprising:

receiving, by a device, an image of a maintenance facility from an image capture system,
the image depicting:
an individual within the maintenance facility,
equipment within the maintenance facility on which the individual is to perform a maintenance activity, or
an activity being performed within the maintenance facility;
processing, by the device, the image using an image processing technique to identify the individual, the equipment, or the activity;
tracking, by the device, the individual, the equipment, or the activity through multiple images of the maintenance facility to facilitate an analysis of the individual, the equipment, or the activity;
performing, by the device, the analysis of the individual, the equipment, or the activity based on a result of tracking the individual, the equipment, or the activity, the analysis to identify underperforming operations of the maintenance facility, and
where performing the analysis comprises:
analyzing movement of the individual through the maintenance facility or around the equipment; and
performing, by the device and after performing the analysis of the movement of the individual through the maintenance facility or around the equipment, an action related to the individual, the equipment, or the activity based on a result of the analysis,
the action to positively impact operations of the maintenance facility.

23. A method, comprising:

receiving, by a device, an image of a maintenance facility from an image capture system,
the image depicting:
an individual within the maintenance facility,
equipment within the maintenance facility on which the individual is to perform a maintenance activity, or
an activity being performed within the maintenance facility;
processing, by the device, the image using an image processing technique to identify the individual, the equipment, or the activity;
tracking, by the device, the individual, the equipment, or the activity through multiple images of the maintenance facility to facilitate an analysis of the individual, the equipment, or the activity;
performing, by the device, the analysis of the individual, the equipment, or the activity based on a result of tracking the individual, the equipment, or the activity, the analysis to identify underperforming operations of the maintenance facility, and
where performing the analysis comprises:
analyzing utilization of a resource of the maintenance facility,
the resource including a maintenance bay of the maintenance facility; and
performing, by the device and after performing the analysis of the utilization of the resource, an action related to the individual, the equipment, or the activity based on a result of the analysis,
the action to positively impact operations of the maintenance facility.

* * * * *